United States Patent
Hu

(10) Patent No.: US 12,369,124 B2
(45) Date of Patent: Jul. 22, 2025

(54) METHOD FOR LIMITING UPLINK TRANSMISSION POWER RADIATION AND RELATED PRODUCT

(71) Applicant: GUANGDONG OPPO MOBILE TELECOMMUNICATIONS CORP., LTD., Dongguan (CN)

(72) Inventor: Rongyi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 678 days.

(21) Appl. No.: 17/515,059

(22) Filed: Oct. 29, 2021

(65) Prior Publication Data
US 2022/0053429 A1    Feb. 17, 2022

Related U.S. Application Data

(63) Continuation of application No. PCT/CN2019/085391, filed on Apr. 30, 2019.

(51) Int. Cl.
*H04W 52/14* (2009.01)
*H04B 1/3827* (2015.01)
*H04W 88/06* (2009.01)

(52) U.S. Cl.
CPC ........ *H04W 52/146* (2013.01); *H04B 1/3838* (2013.01); *H04W 88/06* (2013.01)

(58) Field of Classification Search
CPC ... H04W 52/146; H04W 88/06; H04B 1/3838
See application file for complete search history.

(56) References Cited

U.S. PATENT DOCUMENTS

2015/0327280 A1  11/2015 Zhang et al.
2016/0112913 A1   4/2016 Malkamaki et al.
(Continued)

FOREIGN PATENT DOCUMENTS

CN    105164938 A   12/2015
CN    107889209 A    4/2018
(Continued)

OTHER PUBLICATIONS

3GPP TS 38.331 V15.7.0 (Sep. 2019); Technical Specification Group Radio Access Network; NR; Radio Resource Control (RRC) protocol specification (Release 15), 526 pages.
(Continued)

*Primary Examiner* — Junpeng Chen
(74) *Attorney, Agent, or Firm* — BAYES PLLC

(57) ABSTRACT

Disclosed in embodiments of the present disclosure are a method for limiting uplink transmit power radiation and a related device. The method is applied to a HPUE supporting a DC mode. The DC mode refers to dual connectivity based on a DC frequency band combination. The DC frequency band combination comprises a Long Term Evolution (LTE) frequency band and a New Radio (NR) frequency band. The method includes: determining a transmit power radiation limitation policy of the HPUE in the DC mode; and adjusting an uplink transmission configuration of the HPUE according to the transmit power radiation limitation policy. The uplink transmission configuration includes a TDM pattern for the DC frequency band combination or a maximum uplink duty cycle of at least one of the LTE frequency band or the NR frequency band in the DC frequency band combination.

8 Claims, 9 Drawing Sheets

(56) References Cited

U.S. PATENT DOCUMENTS

| | | | | |
|---|---|---|---|---|
| 2020/0021421 | A1* | 1/2020 | Han | H04W 52/367 |
| 2020/0322900 | A1* | 10/2020 | Guo | H04W 52/36 |
| 2021/0168736 | A1* | 6/2021 | Cho | H04W 52/225 |
| 2021/0250855 | A1* | 8/2021 | Tang | H04W 52/02 |
| 2021/0410186 | A1* | 12/2021 | Hajir | H04W 72/0453 |
| 2022/0141904 | A1* | 5/2022 | Yilmaz | H04W 76/20 370/329 |
| 2022/0369237 | A1* | 11/2022 | Cui | H04B 1/3838 |

FOREIGN PATENT DOCUMENTS

| | | |
|---|---|---|
| CN | 109586943 A | 4/2019 |
| CN | 109587704 A | 4/2019 |
| CN | 109587779 A | 4/2019 |

OTHER PUBLICATIONS

"SAR mitigation for PC2 FDD-TDD EN-DC in FR1", Source: Qualcomm Incorporated, 3GPP TSG-RAN WG4 #90bis, R4-1904619, Apr. 8-12, 2019 Xi'an, CN, 3 pages.

"Discussion on HPUE for inter-band EN-DC", Source: OPPO, 3GPP TSG-RAN WG4 Meeting #90, R4-1901321, Athens, GR, Feb. 25-Mar. 1, 2019, 3 pages.

"Power class 2 UE for TDD-TDD EN-DC", Source: MediaTek Inc., 3GPP TSG-RAN WG4 Meeting #90, R4-1900532, Athens, Greece, Feb. 25-Mar. 1, 2019, 4 pages.

3GPP TS 38.101-3 V15.5.0 (Mar. 2019); Technical Specification Group Radio Access Network; NR; User Equipment (UE) radio transmission and reception; Part 3: Range 1 and Range 2 Interworking operation with other radios (Release 15), 224 pages.

Extended European Search Report issued in corresponding European Application No. 19926802.0, mailed Mar. 24, 2022, 12 pages.

First Office Action issued in corresponding European Application No. 19926802.0, mailed Mar. 14, 2023.

First Office Action issued in corresponding Korean Application No. 10-2021-7038671, mailed Oct. 19, 2023.

International Search Report issued in corresponding International Application No. PCT/CN2019/085391, mailed Jan. 15, 2020, 53 pages.

PCT Written Opinion of the International Searching Authority issued in corresponding International Application No. PCT/CN2019/085391, mailed Jan. 15, 2020, 7 pages.

\* cited by examiner

| UL/DL configurations | Switching duration from DL to UL | Subframe symbols | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

METHOD FOR LIMITING UPLINK TRANSMISSION POWER RADIATION AND RELATED PRODUCT

CROSS-REFERENCE TO RELATED APPLICATION

This application is a continuation of International Application No. PCT/CN2019/085391, filed on Apr. 30, 2019, the entire contents of which are hereby incorporated by reference.

BACKGROUND

Embodiments of the present disclosure generally relate to communication technologies, and more particularly, to a method for limiting uplink transmit power radiation and related product.

Currently, High Power UE (HPUE) may support an E-UTRA-NR Dual Connectivity (EN-DC) function, and for different DC frequency band combinations and maximum transmit power combinations that HPUE may support, current standards have not yet determined a corresponding Specific Absorption Rate (SAR) protection mechanism.

SUMMARY

Embodiments of the present disclosure provide a method for limiting uplink transmit power radiation and a related product in order to, for different frequency band combinations that a high power user equipment may support, formulate corresponding different transmission limitation rules by considering different duplex mode combinations, different maximum transmit power combinations, and whether the frequency band combinations support a single transmission or a dual transmission mode, and accordingly ensure the electromagnetic radiation requirements of the high power terminal (user equipment).

According to a first aspect, an embodiment of the present disclosure provides a method for limiting uplink transmit power radiation. The method is applied to a High Power User Equipment (HPUE) supporting a Dual Connectivity (DC) mode. The DC mode refers to dual connectivity based on a DC frequency band combination, and the DC frequency band combination includes a Long Term Evolution (LTE) frequency band and a New Radio (NR) frequency band. The method includes determining a transmit power radiation limitation policy of the HPUE in the DC mode; and adjusting an uplink transmission configuration of the HPUE according to the transmit power radiation limitation policy, wherein the uplink transmission configuration includes a Time Division Multiplexing (TDM) pattern for the DC frequency band combination or a maximum uplink duty cycle of the LTE frequency band and/or the NR frequency band in the DC frequency band combination.

According to a second aspect, an embodiment of the present disclosure provides a method for limiting uplink transmit power radiation. The method is applied to a network device. A High Power User Equipment (HPUE) supporting a Dual Connectivity (DC) mode is included within a signal coverage range of the network device. The DC mode refers to dual connectivity based on a DC frequency band combination, and the DC frequency band combination includes a Long Term Evolution (LTE) frequency band and a New Radio (NR) frequency band.

The method includes receiving from the HPUE a maximum uplink duty cycle of a NR Time Division Duplex (TDD) frequency band corresponding to a LTE TDD frequency band to adjust an uplink transmission configuration of the HPUE, wherein the maximum uplink duty cycle of the NR TDD frequency band corresponding to the LTE TDD frequency is obtained by the HPUE by performing the following operations: obtaining a transmission mode supported by each DC frequency band combination in at least one DC frequency band combination supported by the HPUE, and obtaining a duplex mode combination and a maximum transmit power combination of the HPUE; and according to the transmission mode supported by each DC frequency band combination, the duplex mode combination and the maximum transmit power combination, determining a transmit power radiation limitation policy of the HPUE in the DC mode; and obtaining a configuration of the LTE TDD frequency band in each DC frequency band combination; and querying a preset uplink duty cycle configuration table to determine the maximum uplink duty cycle of the NR TDD frequency band corresponding to the LTE TDD frequency band, wherein the uplink duty cycle configuration table includes correspondence relationships between maximum uplink duty cycles of LTE TDD frequency bands and maximum uplink duty cycles of NR TDD frequency bands constrained by the maximum transmit power combination; wherein the at least one DC frequency band combination is a frequency band combination that supports a dual transmission mode, and the duplex mode combination is LTE TDD+NR TDD.

Or the method includes receiving from the HPUE a maximum uplink duty cycle of the LTE FDD frequency band and a maximum uplink duty cycle of the NR TDD frequency band in each DC frequency band combination to adjust the uplink transmission configuration of the HPUE, wherein the maximum uplink duty cycle of the LTE FDD frequency band and the maximum uplink duty cycle of the NR TDD frequency band are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the LTE FDD frequency band supports uplink and downlink configurations of a LTE TDD frequency band; wherein the at least one DC frequency band combination is a frequency band combination that supports the dual transmission mode, and the duplex mode combination is LTE TDD+NR TDD.

Or the method includes receiving from the HPUE the maximum uplink duty cycle of the NR TDD frequency band to adjust the uplink transmission configuration of the HPUE, wherein the maximum uplink duty cycle of the NR TDD frequency band is determined by the HPUE after performing the following operations: obtaining the transmission mode supported by each DC frequency band combination in the at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the LTE FDD frequency band does not support the uplink and downlink configurations of the LTE TDD frequency band; wherein the at least one DC frequency band combination is a frequency band combination that supports the dual transmission mode, and the duplex mode combination is LTE TDD+NR TDD.

Or the method includes receiving from the HPUE the maximum uplink duty cycle of the LTE FDD frequency band and the maximum uplink duty cycle of the NR TDD frequency band in each DC frequency band combination to adjust the uplink transmission of the HPUE, wherein the maximum uplink duty cycle of the LTE FDD frequency band and the maximum uplink duty cycle of the NR TDD frequency band are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE is in the dual transmission mode or switches from the single transmission mode to the dual transmission mode; determining, by interacting with the network device, that the LTE FDD frequency band supports the uplink and downlink configurations of the LTE TDD frequency band; wherein the at least one DC frequency band combination is a frequency band combination that supports the single transmission mode, and the duplex mode combination is LTE FDD+NR TDD.

Or the method includes receiving from the HPUE the maximum uplink duty cycle of the NR TDD frequency band in each DC frequency band combination to adjust the uplink transmission configuration of the HPUE, wherein the maximum uplink duty cycle of the NR TDD frequency band is determined by the HPUE after performing the following operations: obtaining the transmission mode supported by each DC frequency band combination in the at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE is in the dual transmission mode or switches from the single transmission mode to the dual transmission mode; and determining, by interacting with the network device, that the LTE FDD frequency band does not support the uplink and downlink configurations of the LTE TDD frequency band; wherein the at least one DC frequency band combination is a frequency band combination that supports the single transmission mode, and the duplex mode combination is LTE FDD+NR TDD.

Or the method includes receiving from the HPUE a preset maximum uplink duty cycle of each DC frequency band combination to adjust the uplink transmission configuration of the HPUE, wherein the preset maximum uplink duty cycle of each DC frequency band combination is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE switches from the dual transmission mode to the single transmission mode; and determining that the maximum transmit power combination of the HPUE is 23 dBm+23 dBm; wherein the at least one DC frequency band combination is a frequency band combination that supports the single transmission mode, and the duplex mode combination is LTE FDD+NR TDD.

Or the method includes receiving from the HPUE maximum uplink duty cycles that are supportable by the LTE FDD frequency band and the NR FDD frequency band in each DC frequency band combination, respectively, to adjust the uplink transmission configuration of the HPUE, wherein the maximum uplink duty cycles that are supportable by the LTE FDD frequency band and the NR FDD frequency band are sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and confirming that the maximum transmit power combination is 23 dBm+26 dBm, and confirming by interacting with the network device that the TDD pattern is configured as the time division multiplexing pattern but the HPUE works in the dual transmission mode.

Or the method includes receiving from the HPUE the maximum uplink duty cycle of the NR TDD frequency band in each DC frequency band combination to adjust the uplink transmission configuration of the HPUE, wherein the maximum uplink duty cycle of the NR TDD frequency band is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination of the HPUE is 23 dBm+23 dBm or 23 dBm+26 dBm and the network device configures the TDD pattern but the HPUE works in the single transmission mode; wherein the at least one DC frequency band combination is a frequency band that supports the single transmission mode, and the duplex mode combination is LTE FDD+NR TDD.

Or the method includes receiving from the HPUE the maximum uplink duty cycles that are supportable by the LTE FDD frequency band and the NR FDD frequency band in each DC frequency band combination support, respectively, to adjust the uplink transmission configuration of the HPUE, wherein the maximum uplink duty cycles that are supportable by the LTE FDD frequency band and the NR FDD frequency band in each DC frequency band combination, respectively, are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; confirming, by interacting with the network device, that no TDD pattern is configured; wherein the at least one DC frequency band combination is a frequency band combination that supports the single transmission mode, and the duplex mode combination is LTE FDD+NR TDD.

Or the method includes receiving from the HPUE the preset maximum uplink duty cycle of each DC frequency band combination to adjust the uplink transmission configuration of the HPUE, wherein the preset maximum uplink duty cycle of each DC frequency band combination is determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; determining that the maximum transmit power combination is 23 dBm+23 dBm, and confirming, by interacting with the network device, that the TDD pattern is configured and the HPUE words in the dual transmission state; wherein the least one DC frequency band combination is a frequency band combination that supports the single transmission mode, and the duplex mode combination is LTE TDD+NR TDD.

Or the method includes receiving from the HPUE the preset maximum uplink duty cycle of each DC frequency band combination to adjust the uplink transmission configuration of the HPUE, wherein the preset maximum uplink duty cycle of each DC frequency band combination is determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination is 23 dBm+26 dBm, and confirming, by interacting with the network device, that the TDD pattern is configured and the HPUE works in the single transmission state or switches from the dual transmission state to the single transmission state or switches from the single transmission state to the dual transmission state; wherein the at least one DC frequency is a frequency band combination that supports the single transmission mode, and the duplex mode combination is LTE TDD+NR TDD.

Or the method includes receiving from the HPUE the preset maximum uplink duty cycle of each DC frequency band combination to adjust the uplink transmission configuration of the HPUE, wherein the preset maximum uplink duty cycle of each DC frequency band combination is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination is 26 dBm+26 dBm; wherein the at least one DC frequency is a frequency band combination that supports the single transmission mode, and the duplex mode combination is LTE TDD+NR TDD.

Or the method includes receiving from the HPUE the Time Division Multiplexing (TDM) pattern for a target DC frequency band combination for the HPUE to adjust the uplink transmission configuration of the HPUE, wherein the TDM pattern for the target DC frequency band combination is sent by the HPUE after performing the following operations: obtaining the transmission mode supported by each DC frequency band combination in the at least one DC frequency band combination supported by the HPUE, and obtaining the duplex mode combination, the maximum transmit power combination and a regional feature of the HPUE; and according to the transmission mode supported by each DC frequency band combination, the duplex mode combination, the maximum transmit power combination and the regional feature, determining the transmit power radiation limitation policy of the HPUE in the DC mode; and obtaining a preset DC frequency band combination configuration set corresponding to the regional features; and according to the transmission mode supported by each DC frequency band combination, the duplex mode combination, the maximum transmit power combination, and the DC frequency band combination configuration set, determining the TDM pattern for the target DC frequency band combination available for the HPUE.

According to a third aspect, an embodiment of the present disclosure provides a device for limiting uplink transmit power radiation. The device is applied to a High Power User Equipment (HPUE) supporting a Dual Connectivity (DC) mode. The DC mode refers to dual connectivity based on a DC frequency band combination, and the DC frequency band combination includes a Long Term Evolution (LTE) frequency band and a New Radio (NR) frequency band. The device includes a processing unit and a communication unit, wherein the processing unit is configured to determine a transmit power radiation limitation policy of the HPUE in the DC mode; and adjust via the communication unit an uplink transmission configuration of the HPUE according to the transmit power radiation limitation policy, wherein the uplink transmission configuration includes a Time Division Multiplexing (TDM) pattern for the DC frequency band combination or a maximum uplink duty cycle of the LTE frequency band and/or the NR frequency band in the DC frequency band combination.

According to a fourth aspect, an embodiment of the present disclosure provides a device for limiting uplink transmit power radiation. The device is applied to a network device. A High Power User Equipment (HPUE) supporting a Dual Connectivity (DC) mode is included within a signal coverage range of the network device. The DC mode refers to dual connectivity based on a DC frequency band combination, and the DC frequency band combination includes a Long Term Evolution (LTE) frequency band and a New Radio (NR) frequency band. The device includes a processing unit and a communication unit, wherein the processing unit is configured to perform the following operations: receiving from the HPUE a maximum uplink duty cycle of a NR Time Division Duplex (TDD) frequency band corresponding to a LTE TDD frequency band via the communication unit to adjust an uplink transmission configuration of the HPUE, wherein the maximum uplink duty cycle of the NR TDD frequency band corresponding to the LTE TDD frequency is obtained by the HPUE by performing the following operations: obtaining a transmission mode supported by each DC frequency band combination in at least one DC frequency band combination supported by the HPUE, and obtaining a duplex mode combination and a maximum transmit power combination of the HPUE; and according to the transmission mode supported by each DC frequency band combination, the duplex mode combination and the maximum transmit power combination, determining a transmit power radiation limitation policy of the HPUE in the DC mode; and obtaining a configuration of the LTE TDD frequency band in each DC frequency band combination; and querying a preset uplink duty cycle configuration table to determine the maximum uplink duty cycle of the NR TDD frequency band corresponding to the LTE TDD frequency band, wherein the uplink duty cycle configuration table includes correspondence relationships between maximum uplink duty cycles of LTE TDD frequency bands and maximum uplink duty cycles of NR TDD frequency bands constrained by the maximum transmit power combination, wherein the at least one DC frequency band combination is a frequency band combination that supports a dual transmission mode, and the duplex mode combination is LTE TDD+NR TDD.

Or the processing unit is configured to perform the following operations: receiving from the HPUE a maximum uplink duty cycle of the LTE FDD frequency band and a maximum uplink duty cycle of the NR TDD frequency band in each DC frequency band combination via the communication unit to adjust the uplink transmission configuration of the HPUE, wherein the maximum uplink duty cycle of the LTE FDD frequency band and the maximum uplink duty cycle of the NR TDD frequency band are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the LTE FDD frequency band supports uplink and downlink configurations of a LTE TDD frequency band, wherein the at least one DC frequency band combination is a frequency band combination that supports the dual transmission mode, and the duplex mode combination is LTE TDD+NR TDD.

Or the processing unit is configured to perform the following operations: receiving from the HPUE the maximum uplink duty cycle of the NR TDD frequency band via the communication unit to adjust the uplink transmission configuration of the HPUE, wherein the maximum uplink duty cycle of the NR TDD frequency band is determined by the HPUE after performing the following operations: obtaining the transmission mode supported by each DC frequency band combination in the at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the LTE FDD frequency band does not support the uplink and downlink configurations of the LTE TDD frequency band, wherein the at least one DC frequency band combination is a frequency band combination that supports the dual transmission mode, and the duplex mode combination is LTE TDD+NR TDD.

Or the processing unit is configured to perform the following operations: receiving from the HPUE the maximum uplink duty cycle of the LTE FDD frequency band and the maximum uplink duty cycle of the NR TDD frequency band in each DC frequency band combination via the communication unit to adjust the uplink transmission of the HPUE, wherein the maximum uplink duty cycle of the LTE FDD frequency band and the maximum uplink duty cycle of the NR TDD frequency band are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE is in the dual transmission mode or switches from the single transmission mode to the dual transmission mode; determining, by interacting with the network device, that the LTE FDD frequency band supports the uplink and downlink configurations of the LTE TDD frequency band; wherein the at least one DC frequency band combination is a frequency band combination that supports the single transmission mode, and the duplex mode combination is LTE FDD+NR TDD.

Or the processing unit is configured to perform the following operations: receiving from the HPUE the maximum uplink duty cycle of the NR TDD frequency band in each DC frequency band combination via the communication unit to adjust the uplink transmission configuration of the HPUE, wherein the maximum uplink duty cycle of the NR TDD frequency band is determined by the HPUE after performing the following operations: obtaining the transmission mode supported by each DC frequency band combination in the at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE is in the dual transmission mode or switches from the single transmission mode to the dual transmission mode; and determining, by interacting with the network device, that the LTE FDD frequency band does not support the uplink and downlink configurations of the LTE TDD frequency band, wherein the at least one DC frequency band combination is a frequency band combination that supports the single transmission mode, and the duplex mode combination is LTE FDD+NR TDD.

Or the processing unit is configured to perform the following operations: receiving from the HPUE a preset maximum uplink duty cycle of each DC frequency band combination via the communication unit to adjust the uplink transmission configuration of the HPUE, wherein the preset maximum uplink duty cycle of each DC frequency band combination is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE switches from the dual transmission mode to the single transmission mode; and determining that the maximum transmit power combination of the HPUE is 23 dBm+23 dBm, wherein the at least one DC frequency band combination is a frequency band combination that supports the single transmission mode, and the duplex mode combination is LTE FDD+NR TDD.

Or the processing unit is configured to perform the following operations: receiving from the HPUE maximum uplink duty cycles that are supportable by the LTE FDD frequency band and the NR FDD frequency band in each DC frequency band combination, respectively, via the communication unit to adjust the uplink transmission configuration of the HPUE, wherein the maximum uplink duty cycles that are supportable by the LTE FDD frequency band and the NR FDD frequency band are sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and confirming that the maximum transmit power combination is 23 dBm+26 dBm, and confirming by interacting with the network device that the TDD pattern is configured as the time division multiplexing pattern but the HPUE works in the dual transmission mode; or, receiving from the HPUE the maximum uplink duty cycle of the NR TDD frequency band in each DC frequency band combination via the communication unit to adjust the uplink transmission configuration of the HPUE, wherein the maximum uplink duty cycle of the NR TDD frequency band is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination of the HPUE is 23 dBm+23 dBm or 23 dBm+26 dBm and the network device configures the TDD pattern but the HPUE works in the single transmission mode; wherein the at least one DC frequency band combination is a frequency band that supports the single transmission mode, and the duplex mode combination is LTE FDD+NR TDD.

Or the processing unit is configured to perform the following operations: receiving from the HPUE the maximum uplink duty cycles that are supportable by the LTE FDD frequency band and the NR FDD frequency band in each DC frequency band combination support, respectively, via the communication unit to adjust the uplink transmission configuration of the HPUE, wherein the maximum uplink duty cycles that are supportable by the LTE FDD frequency band and the NR FDD frequency band in each DC frequency band combination, respectively, are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; confirming, by interacting with the network device, that no TDD pattern is configured, wherein the at least one DC frequency band combination is a frequency band combination that supports the single transmission mode, and the duplex mode combination is LTE FDD+NR TDD.

Or the processing unit is configured to perform the following operations: receiving from the HPUE the preset maximum uplink duty cycle of each DC frequency band combination via the communication unit to adjust the uplink transmission configuration of the HPUE, wherein the preset maximum uplink duty cycle of each DC frequency band combination is determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; determining that the maximum transmit power combination is 23 dBm+23 dBm, and confirming, by interacting with the network device, that the TDD pattern is configured and the HPUE words in the dual transmission state, wherein the least one DC frequency band combination is a frequency band combination that supports the single transmission mode, and the duplex mode combination is LTE TDD+NR TDD.

Or the processing unit is configured to perform the following operations: receiving from the HPUE the preset maximum uplink duty cycle of each DC frequency band combination via the communication unit to adjust the uplink transmission configuration of the HPUE, wherein the preset maximum uplink duty cycle of each DC frequency band combination is determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination is 23 dBm+26 dBm, and confirming, by interacting with the network device, that the TDD pattern is configured and the HPUE works in the single transmission state or switches from the dual transmission state to the single transmission state or switches from the single transmission state to the dual transmission state, wherein the at least one DC frequency is a frequency band combination that supports the single transmission mode, and the duplex mode combination is LTE TDD+NR TDD.

Or the processing unit is configured to perform the following operations: receiving from the HPUE the preset maximum uplink duty cycle of each DC frequency band combination via the communication unit to adjust the uplink transmission configuration of the HPUE, wherein the preset maximum uplink duty cycle of each DC frequency band combination is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination is 26 dBm+26 dBm, wherein the at least one DC frequency is a frequency band combination that supports the single transmission mode, and the duplex mode combination is LTE TDD+NR TDD.

Or the processing unit is configured to perform the following operations: receiving from the HPUE the Time Division Multiplexing (TDM) pattern for a target DC frequency band combination for the HPUE via the communication unit to adjust the uplink transmission configuration of the HPUE, wherein the TDM pattern for the target DC frequency band combination is sent by the HPUE after performing the following operations: obtaining the transmission mode supported by each DC frequency band combination in the at least one DC frequency band combination supported by the HPUE, and obtaining the duplex mode combination, the maximum transmit power combination and a regional feature of the HPUE; and according to the transmission mode supported by each DC frequency band combination, the duplex mode combination, the maximum transmit power combination and the regional feature, determining the transmit power radiation limitation policy of the HPUE in the DC mode; and obtaining a preset DC frequency band combination configuration set corresponding to the regional features; and according to the transmission mode supported by each DC frequency band combination, the duplex mode combination, the maximum transmit power combination, and the DC frequency band combination configuration set, determining the TDM pattern for the target DC frequency band combination available for the HPUE.

According to a fifth aspect, an embodiment of the present disclosure provides a high power user equipment, including a processor, a memory, a communication interface and one or more programs, wherein the one or more programs are stored in the memory and configured to be executed by the processor, and the one or more programs include instructions for performing steps in the method according to the first aspect.

According to a sixth aspect, an embodiment of the present disclosure provides a network device, including a processor, a memory, a communication interface and one or more programs, wherein the one or more programs are stored in the memory and configured to be executed by the processor, and the one or more programs include instructions for performing steps in the method according to the second aspect.

According to a seventh aspect, an embodiment of the present disclosure provides a computer-readable storage medium storing a computer program for electronic data exchange, wherein the computer program causes a computer to perform all or part of steps in the method according to any one of the first and second aspects.

An embodiment of the present disclosure provides a computer program product, wherein the computer program product includes a non-transitory computer-readable storage medium storing a computer program, and the computer program is operable to cause a computer to perform part or all of the steps described in any method of the first aspect or the second aspect. The computer program product may be a software installation package.

As can be seen from above, in embodiments of the present disclosure, the high power terminal first determines the transmission power radiation limitation policy of the high power terminal in the DC mode, and then adjusts the uplink transmission configuration of the high power terminal according to the transmission power radiation limitation policy. The uplink transmission configuration includes a Time Division Multiplexing (TDM) pattern for the DC frequency band combination or a maximum uplink duty cycle of the LTE frequency band and/or the NR frequency band in the DC frequency band combination. The high power terminal supports a Dual Connectivity (DC) mode, and the DC mode refers to dual connectivity based on the DC frequency band combination, and the DC frequency band combination includes a Long Term Evolution (LTE) frequency band and a New Radio (NR) frequency band. It can be seen that the high power terminal in embodiments of the present disclosure can dynamically determine the transmission power radiation limitation policy in the DC mode, and adjust the local uplink transmission configuration according to the transmission power radiation limitation policy, that is, flexibly set the transmission restriction rules, so that the electromagnetic radiation requirements of the high power terminal in the uplink transmission procedure can be guaranteed.

BRIEF DESCRIPTION OF THE DRAWINGS

The following will briefly introduce the drawings that need to be used in the description of embodiments or related arts.

FIG. 1B is an example diagram of seven optional modes of LTE TDD according to an embodiment of the present disclosure.

FIG. 1C is an example diagram of a TDD configuration according to an embodiment of the present disclosure.

DETAILED DESCRIPTION

The technical solutions in embodiments of the present disclosure will be described below with reference to the accompanying drawings.

Figure 1A:
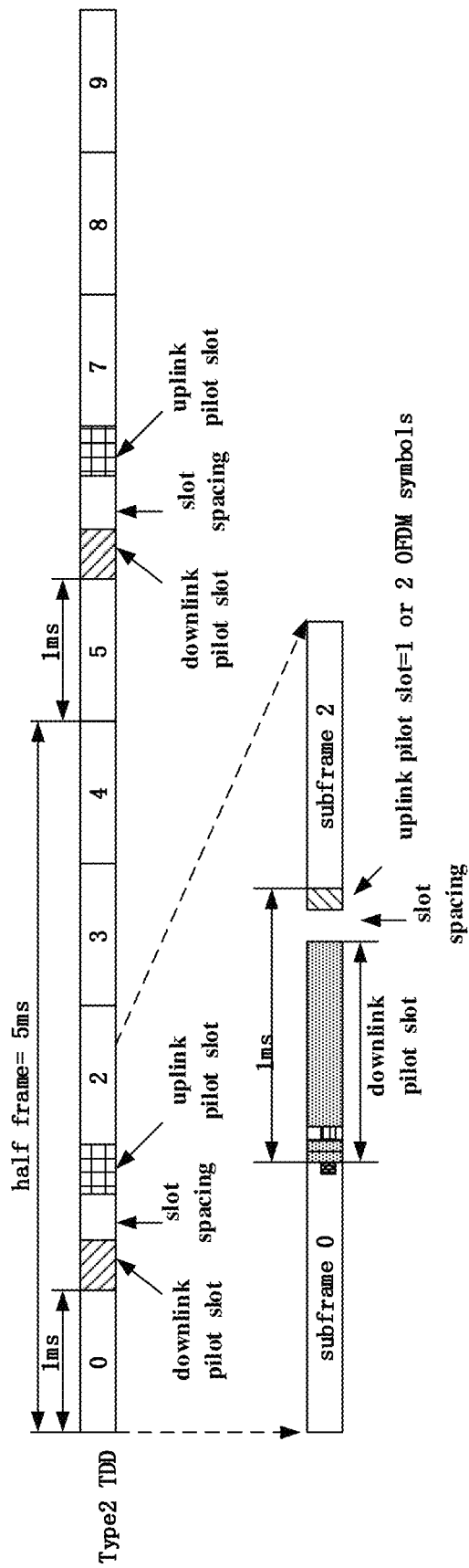
FIG. 1A is an example diagram of an LTE TDD configuration according to an embodiment of the present disclosure.

As shown in FIG. 1A and FIG. 1B, the existing LTE Time Division Duplexing (TDD) configurations include seven configurations as shown in the figures (corresponding to 0/1/2/3/4/5/6 in FIG. 1). For the LTE TDD frequency band, such as B41, the existing SAR solution is defined as follows in the standard: the TDD configurations of LTE are limited, and the basic principle is that a configuration of uplink (UL) duty cycle not exceeding 50% is allowed; otherwise, the configuration is not allowed.

If UE supports a different power class than the default UE power class (generally, Power Class 3, 23 dBm) for EN-DC band combination, and the supported power class enables higher maximum output power than that of the default power class: if the LTE UL/DL configuration is 0 or 6, or if the LTE UL/DL configuration is 1 and special subframe configuration is 0 or 5, or if the IE p-maxUE-FR1 (RRC signaling, indicating the maximum transmit power which can be configured for the UE in LTE or NR FR1 frequency band) as defined in TS 38.331 [7] is provided and set to the maximum output power of the default power class or lower, apply all requirements for the default power class, and set the configured transmitted power as specified in sub-clause 6.2B.4 in 36.101-1; or else, apply all requirements for the supported power class, and set the configured transmitted power class as specified in sub-clause 6.2B.4 in 36.101-1.

The above-mentioned mechanism that satisfies SAR is also applicable to in-band continuous EN-DC combination (E-UTRA and NR dual connectivity), such as LTE B41+NR n41.

NR UL/DL configuration for EN-DC HPUE will follow LTE's TDD HPUE configuration, i.e., the max UL duty cycle is 50%.

Figure 1C:
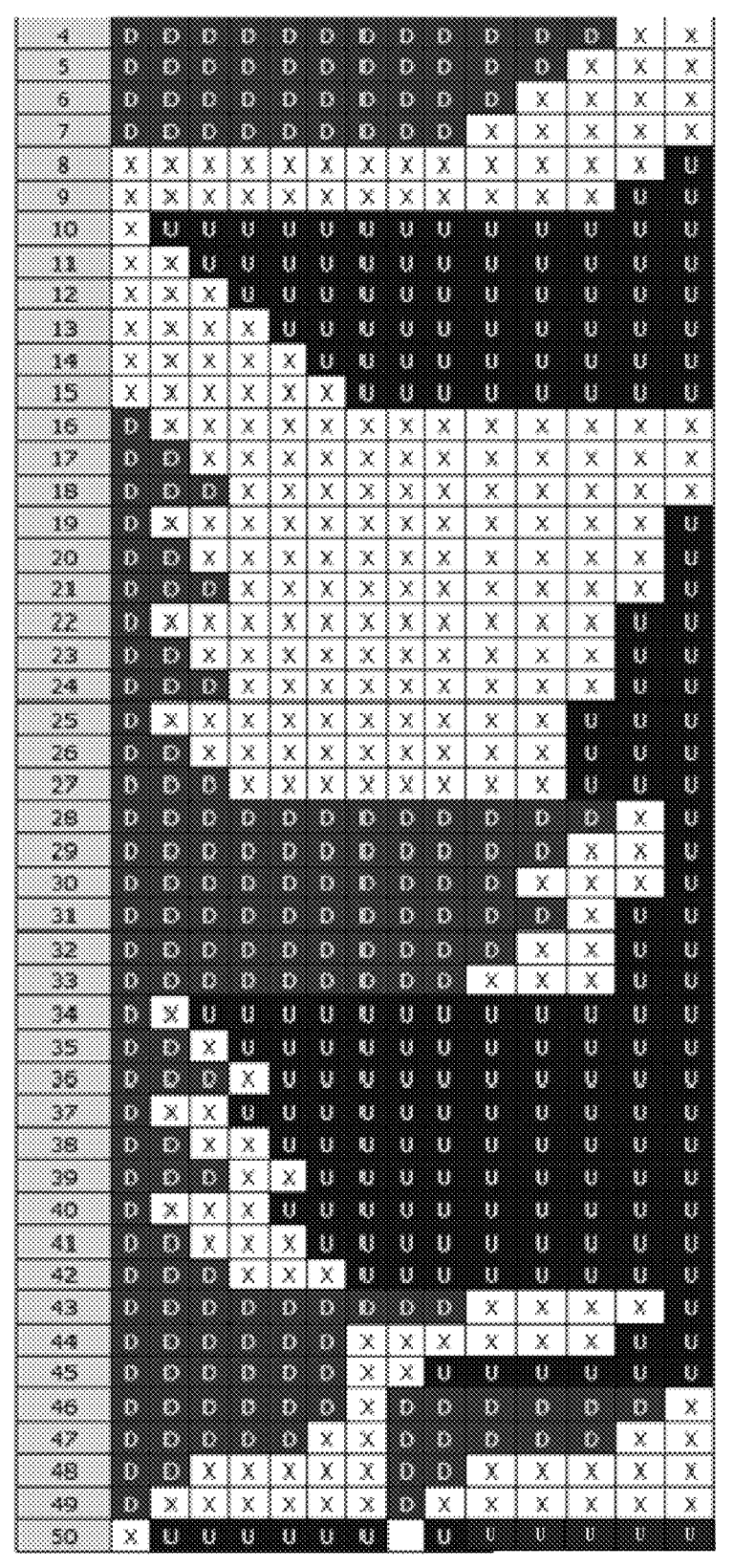

The NR TDD configurations are very flexible, and there are dozens of configurations, as shown in FIG. 1C.

SAR is the electromagnetic wave energy (dW) (30 MHz-10 GHz) absorbed by biological tissue per unit time (dt) or unit mass (dm or ρdV). Limit: the average specific absorption rate SAR of any 10 g biological tissue for any continuous 6 minutes shall not exceed 2.0 W/Kg.

Note: SAR may be calculated according to the following formulas:

$$SAR = \frac{\sigma E^2}{\rho}$$

$$SAR = c_h \frac{dT}{dt}\bigg|_{t=0}$$

Where: E is the effective value of the electric field intensity (V/m) in tissue; σ is the conductivity (S/m) of the tissue; ρ is the tissue density (kg/m³); $c_h$ is the calorific capacity of the tissue (J/(kg K));

$$\frac{dT}{dt}\bigg|_{t=0}$$

is the temperature change rate in the tissue at the beginning (K/s).

For devices in frequency bands such as millimeter waves, another measurement index (power density) is used, which is generally applicable to frequency bands above 10 GHz.

The following equation shows the relationship between the power per unit area perpendicular to the direction of propagation and electric and magnetic fields:

$$S = EH = E^2/377 = 377H^2 \quad (1)$$

Where: E is the force exerted by the electric field on the charge (V/m); H is the force exerted by the magnetic field on the charge (A/m); the unit of the power density is S (W/m²).

The distance below is a distance at which the field strength of electric field of the incident plane wave (of a given frequency) from the boundary of the lossy medium to the inside of the medium is attenuated to 1/e of its original value. Plane waves are often generated in the half-space of the plane, and their penetration depth δ is determined by the following formula 2.

$$\delta = \frac{1}{\omega}\left[\left(\frac{\mu_0 \varepsilon'_r \varepsilon_0}{2}\right)\left(\sqrt{1 + \left(\frac{\sigma}{\omega \varepsilon'_r \varepsilon_0}\right)^2} - 1\right)\right]^{-\frac{1}{2}} \quad (2)$$

Where: δ is the skin depth in meters; ω is the angular frequency in radian per second; $\varepsilon'_r$ is the real part of relative complex permittivity; $\varepsilon_0$ is the permittivity of free space in farad per meter; $\mu_0$ is the permeability of free space in henry per meter; σ is the dielectric conductivity in siemens per meter.

At present, for the frequency band combination of LTE TDD+NR TDD (duplex mode), the following mechanism for LTE TDD PC3+NR TDD PC3 is established to limit and report the uplink duty cycle.

As network based solution, at least the following is proposed.

Introducing a new signaling which indicates that the NR maxUplinkDutyCycle capability corresponds to LTE UL/DL configuration and it is a per band combination capability.

The NR maxUplinkDutyCycle capability for PC2 inter-band EN-DC is optional.

The UE behaviour is FFS if NR maxUplinkDutyCycle capability for PC2 inter-band EN-DC is absent.

It is assumed that the UE follows the UL grant regardless of duty-cycle indication (but can account for the indication).

The values range of NR maxUplinkDutyCycle for PC2 inter-band EN-DC are from [20]% to 100% and the default value for NR uplink duty cycle can be specified according to different TDD configurations as following.

TABLE 1

| UL duty cycle configuration table for dual connectivity frequency band combinations | | | | | | | |
|---|---|---|---|---|---|---|---|
| LTE uplink/downlink (UL/DL) configurations (UL duty cycle) | 0 (60%) | 1 (40%) | 2 (20%) | 3 (30%) | 4 (20%) | 5 (10%) | 6 (50%) |
| default value for NR uplink duty cycle (10% as granularity) | [40]% | [60]% | [80]% | [70]% | [80]% | [90]% | [50]% |

UE based solution is FFS (for further study). Also solution to combine network and UE based solution will be FFS.

Based on the above existing progresses and conclusions, according to the countable UL/DL configurations for LTE TDD, only the maximum uplink duty cycle (maxUplinkDutyCycle) of the corresponding NR TDD needs to be reported, if the terminal behavior which the signaling does not report is still undefined. In addition to this method which relies on network-side scheduled restrictions, solutions that the terminal can autonomously implement, such as using a sensor to determine the power reduction or fallback of power class, are not ruled out.

In addition, for LTE TDD PC2+NR TDD PC3 and LTE TDD PC2+NR TDD PC2, the situations of HPUE may be different, and the working mechanism needs to be discussed.

Figure 1D:
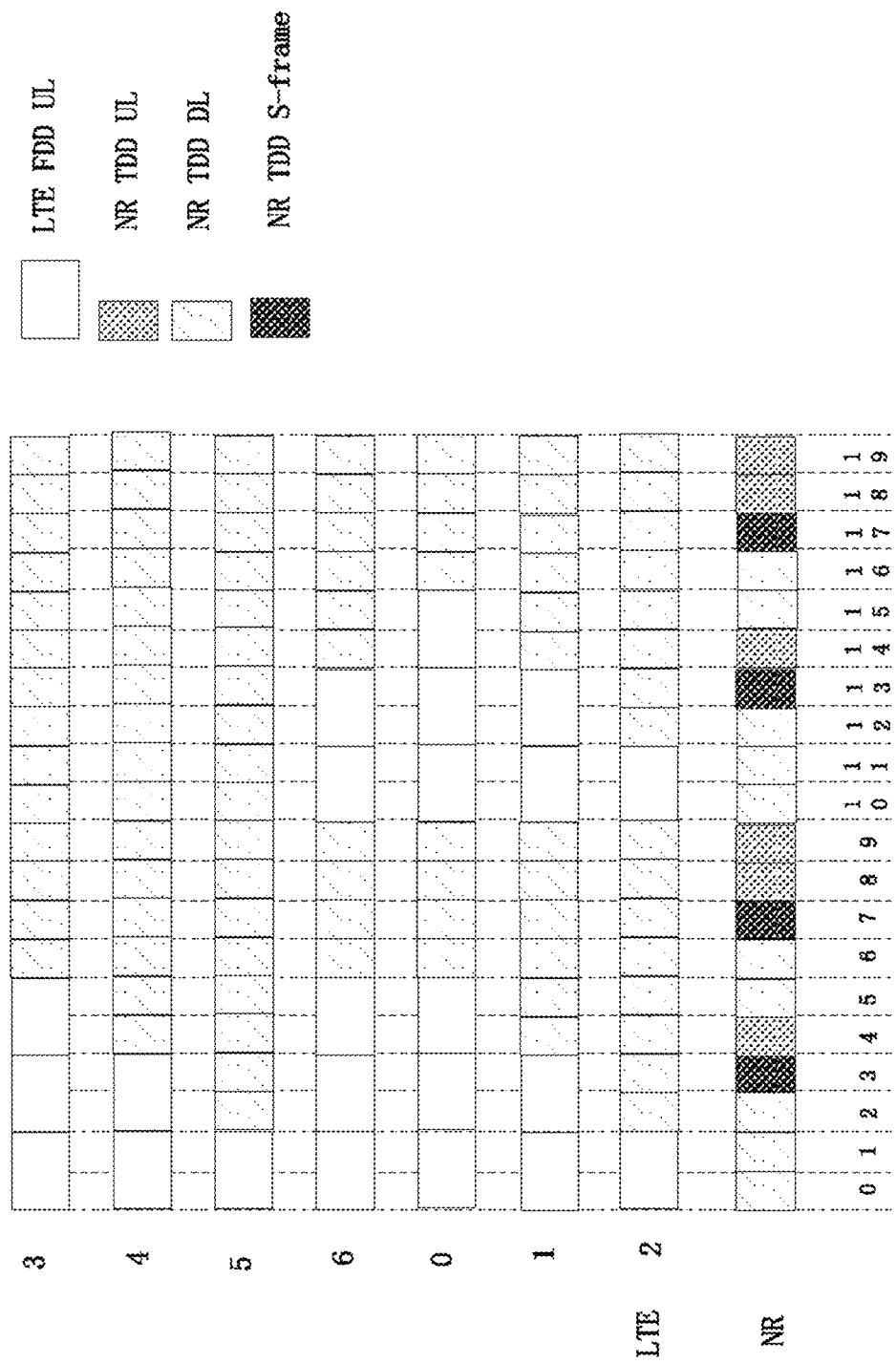
FIG. 1D is an example diagram of a TDM pattern supporting a dual transmission mode according to an embodiment of the present disclosure.
Figure 1E:
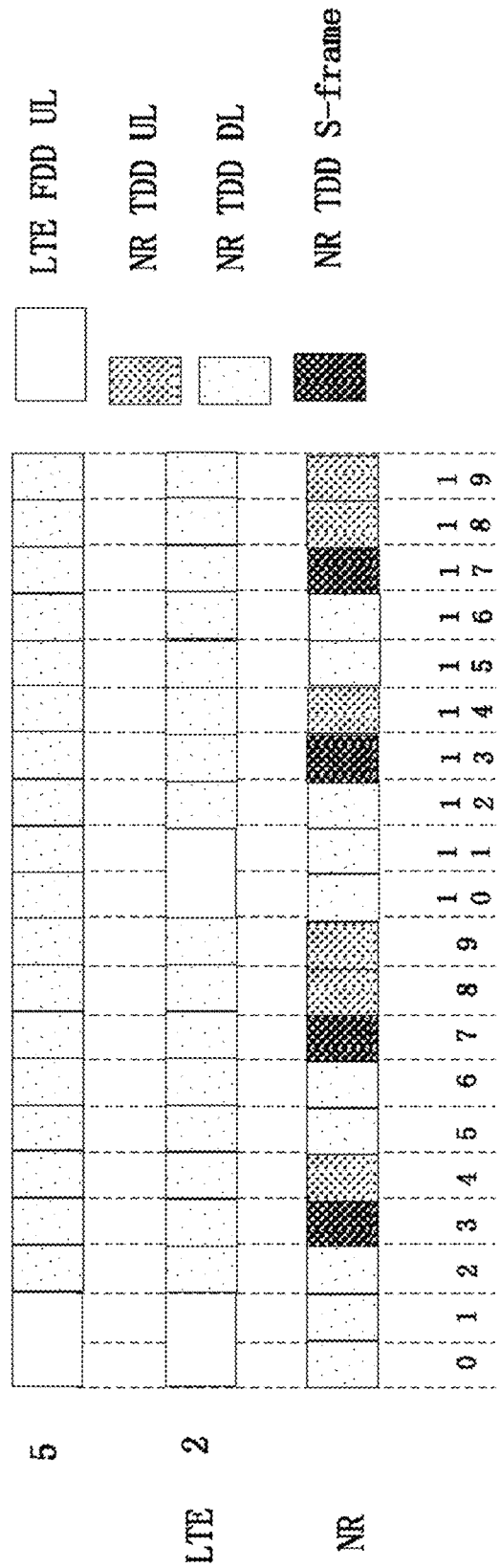
FIG. 1E is an example diagram of a TDM pattern supporting a single transmission mode according to an embodiment of the present disclosure.
Figure 1F:
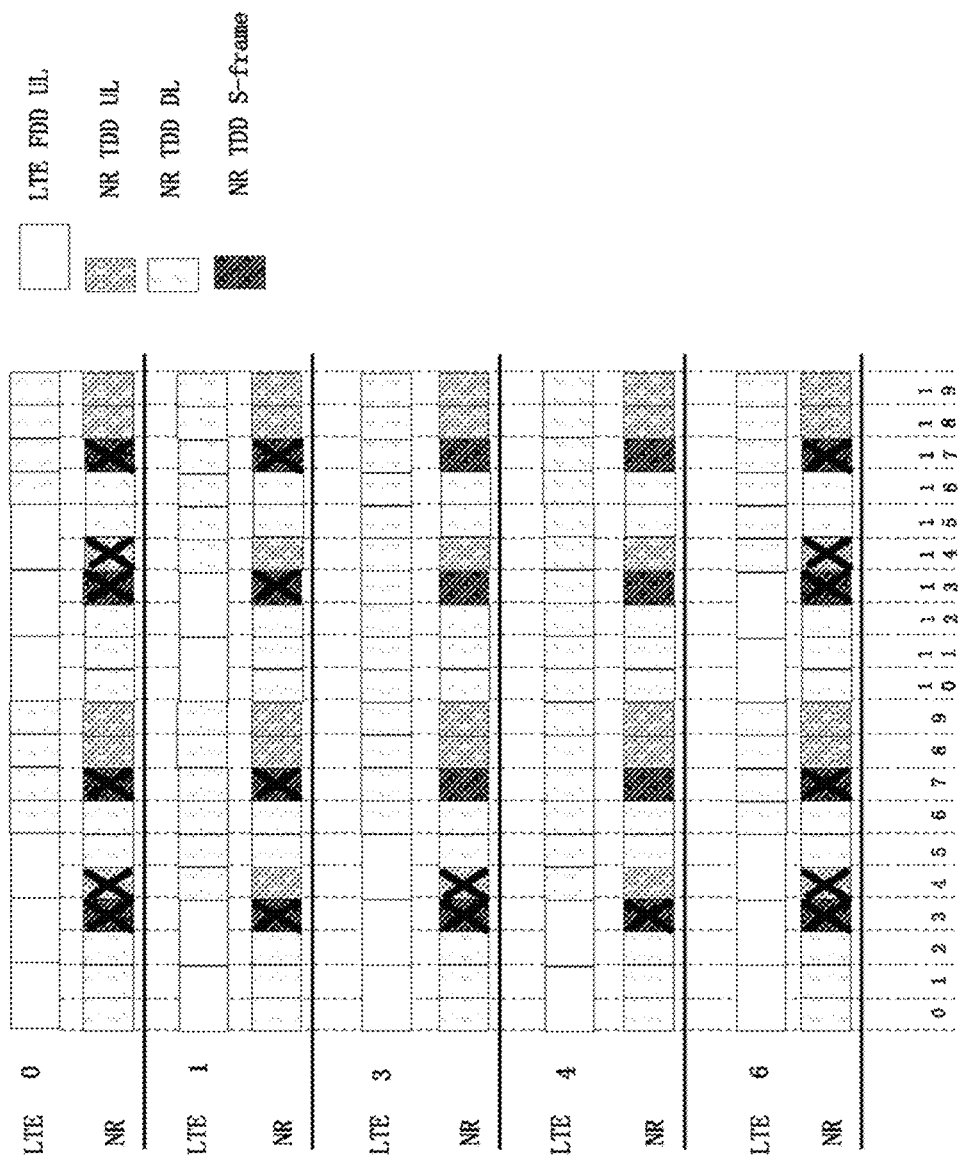
FIG. 1F is an example diagram of another TDM pattern supporting a single transmission mode according to an embodiment of the present disclosure.

For LTE FDD+NR TDD, taking LTE B3+NR n78 as an example, there is currently an approach in which LTE FDD will continue to use the UL/DL configurations for LTE TDD, as shown in FIG. 1D, FIG. 1E, and FIG. 1F. Based on this, whether the TDM pattern meets the requirements of the uplink duty cycle is further discussed. FIG. 1D shows the case of a feasible TDM pattern, and FIG. 1E and FIG. 1F show the case of a single transmission working state.

For some areas, the NR TDD configuration is clear, and the LTE FDD configuration may be specified. But in fact, NR is very flexible, and there are dozens of configurations, which will limit the flexibility of base station scheduling, and more than just these configurations can be supported.

(1) For HPUE, different DC frequency band combinations and maximum transmit power combinations for E-UTRA-NR Dual Connectivity (EN-DC) have not yet been determined in the current standards; and there are many classifications. In particular, the FDD+FDD situation has not yet been discussed, and there is no corresponding definition regarding the SAR protection mechanism. Corresponding to four TDD/FDD combinations. Three LTE/NR max power combinations. Whether the DC band combination supports single TX.

(2) For LTE TDD+NR TDD HPUE, the behavior of the terminal if the signaling does not report is still undefined. In addition to this method which relies on network-side scheduling restrictions, solutions in which the terminal can autonomously implement, such as using a sensor to determine the power reduction or fallback of power class, are not ruled out. In addition, for LTE TDD PC2+NR TDD PC3 and LTE TDD PC2+NR TDD PC2, the situations of HPUE may be different, and the working mechanism needs to be discussed.

For LTE FDD+NR TDD HPUE, there is currently no convergence mechanism except for agreeing to introduce similar uplink duty cycle reporting signaling.

(3) For a frequency band combination that can support single Tx mode, the TDM pattern is completely implemented by base station scheduling. If it is not clear that the terminal capability is reported to the base station (such as the maximum uplink duty cycle), the terminal needs to make some explicit restrictions on the TDM pattern like LTE TDD. There is still no clear conclusion on the specific restriction method.

Based on the above, the present disclosure formulates a complete and feasible uplink transmit power radiation limitation mechanism for all possible LTE+NR DC frequency band combinations and maximum transmit power combinations that may occur for HPUE, so as to flexibly and reliably guarantee the SAR requirements of the terminal.

The technical solutions will be described below in detail.

The present disclosure provides a method for limiting the uplink transmit power radiation. In addition to the autonomous power back-off of the terminal and the power adjustment triggered by a sensor, the present disclosure also mainly provides a method in which the terminal can report its capability indication based on different application scenarios and frequency band combinations, combined with base station scheduling, to ensure that the uplink transmit power statistics of the terminal do not go beyond the requirement, achieving the purpose of safety management of electromagnetic radiation.

According to duplex mode combinations for frequency band combinations, there are four combinations. For different maximum transmit power combinations and whether the frequency band combinations support a single transmission mode or a dual transmission mode, different transmission limitation rules may be formulated to ensure the electromagnetic radiation requirements of the terminal.

Table 2, Table 3 and the program example 1 show all the situations of duplex modes, maximum transmit power, and the terminal capability of whether SUO is supported.

TABLE 2

| duplex mode combinations for LTE + NR HPUE | | |
|---|---|---|
| | LTE duplex mode | NR duplex mode |
| duplex mode combinations | TDD | TDD |
| | FDD | TDD |
| | FDD | FDD |
| | TDD | FDD |

TABLE 3

| maximum transmit power combinations for LTE + NR HPUE | | | |
|---|---|---|---|
| | EN-DC total power | LTE maximum power | NR maximum power |
| 1 | 26 dBm | 23 dBm | 23 dBm |
| 2 | 26 dBm | 23 dBm | 26 dBm |
| 2 | 26 dBm | 26 dBm | 26 dBm |

Program Example 1: Information Element of
Measurement Report for DC (MRDC) Parameter

```
MRDC-Parameters ::=     SEQUENCE {
    singleUL-Transmission       ENUMERATED {supported} OPTIONAL,
    dynamicPowerSharing         ENUMERATED {supported} OPTIONAL,
    tdm-Pattern                 ENUMERATED {supported} OPTIONAL,
    .......
}(singleUL-Transmission refers to the single uplink transmission,
dynamicPowerSharing refers to dynamic power sharing, and tdm-
Pattern refers to time division mulplexing pattern)
```

Figure 2:
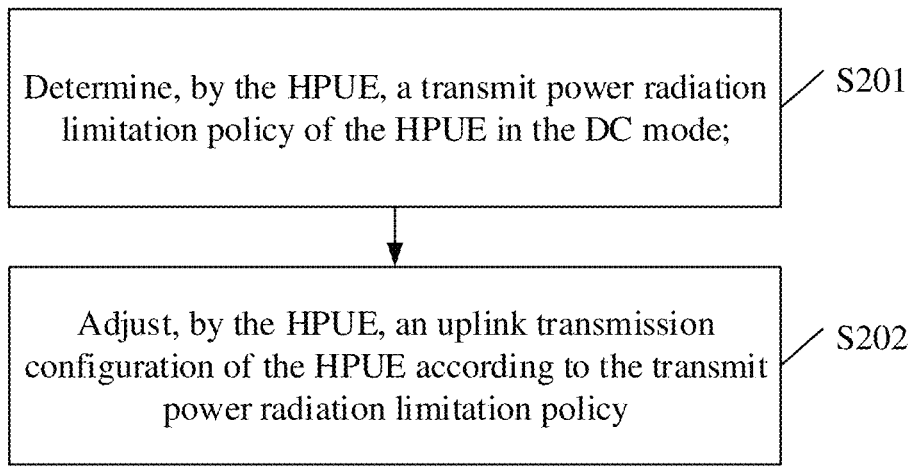
FIG. 2 is a schematic flowchart of a method for limiting uplink transmit power radiation according to an embodiment of the present disclosure.

FIG. 2 is a method for limiting uplink transmit power radiation according to an embodiment of the present disclosure. The method is applied to a High Power User Equipment (HPUE) supporting a Dual Connectivity (DC) mode. The DC mode refers to dual connectivity based on a DC frequency band combination, and the DC frequency band combination includes a Long Term Evolution (LTE) frequency band and a New Radio (NR) frequency band. The method includes the following steps.

In step 201, the HPUE determines a transmit power radiation limitation policy of the HPUE in the DC mode.

The transmit power radiation limitation policy includes any one of the following: (1) reporting capability indication combined with base station scheduling based on different application scenarios and frequency band combinations to ensure that the uplink power statistics transmitted by the terminal does not go beyond the requirement; (2) autonomous power back-off; (3) power adjustment triggered by a sensor.

In step 202, the HPUE adjusts an uplink transmission configuration of the HPUE according to the transmit power radiation limitation policy. The uplink transmission configuration includes a Time Division Multiplexing (TDM) pattern for the DC frequency band combination or a maximum uplink duty cycle of the LTE frequency band and/or the NR frequency band in the DC frequency band combination.

As can be seen from above, in embodiments of the present disclosure, the high power terminal first determines the transmission power radiation limitation policy of the high power terminal in the DC mode, and then adjusts the uplink transmission configuration of the high power terminal according to the transmission power radiation limitation policy. The uplink transmission configuration includes a Time Division Multiplexing (TDM) pattern for the DC frequency band combination or a maximum uplink duty cycle of the LTE frequency band and/or the NR frequency band in the DC frequency band combination. The high power terminal supports a Dual Connectivity (DC) mode, and the DC mode refers to dual connectivity based on the DC frequency band combination, and the DC frequency band combination includes a Long Term Evolution (LTE) frequency band and a New Radio (NR) frequency band. It can be seen that the high power terminal in embodiments of the present disclosure can dynamically determine the transmission power radiation limitation policy in the DC mode, and adjust the local uplink transmission configuration according to the transmission power radiation limitation policy, that is, flexibly set the transmission restriction rules, so that the electromagnetic radiation requirements of the high power terminal in the uplink transmission procedure can be guaranteed.

In a possible example, determining the transmit power radiation limitation policy of the HPUE in the DC mode includes obtaining, by the HPUE, a transmission mode supported by each DC frequency band combination in at least one DC frequency band combination supported by the HPUE, and obtaining a duplex mode combination and a maximum transmit power combination of the HPUE; and according to the transmission mode supported by each DC frequency band combination, the duplex mode combination and the maximum transmit power combination, determining the transmit power radiation limitation policy of the HPUE in the DC mod.

The transmission mode includes a single transmission mode and a dual transmission mode, the duplex mode combination includes the combinations described in Table 2 above, and the maximum transmit power combination includes the combinations shown in Table 3 above.

It can be seen that in this example, for the frequency band combinations that HPUE may support, different duplex mode combinations, different maximum transmit power combinations and whether the frequency band combinations support the single transmission mode or the dual transmission mode are considered to formulate correspondingly different transmission restriction rules, to ensure the electromagnetic radiation requirements of the HPUE.

In a possible example, the at least one DC frequency band combination is a frequency band combination that supports the dual transmission mode, and the duplex mode combination is LTE Time Division Duplex (TDD)+NR TDD.

Adjusting, by the HPUE, the uplink transmission configuration of the HPUE according to the transmit power radiation limitation policy includes obtaining, by the HPUE, a configuration of a LTE TDD frequency band in each DC frequency band combination; querying a preset uplink duty cycle configuration table to determine a maximum uplink duty cycle of a NR TDD frequency band corresponding to the LTE TDD frequency band, wherein the uplink duty cycle configuration table includes correspondence relationships between maximum uplink duty cycles of LTE TDD frequency bands and maximum uplink duty cycles of NR TDD frequency bands constrained by the maximum transmit power combination; and sending to a network device the maximum uplink duty cycle of the NR TDD frequency band corresponding to the LTE TDD frequency band to adjust the uplink transmission configuration of the HPUE.

For the maximum transmit power combinations 23 dBm+23 dBm and 23 dBm+26 dBm, the LTE TDD configurations are countable and known, and the HPUE does not need to report its capabilities, and the HPUE only needs to limit the maximum uplink duty cycle of the corresponding NR TDD frequency band, and reports the capability information. The HPUE may report two sets of values (the maximum uplink duty cycle of the NR TDD frequency band as shown in Table 1).

For the maximum transmit power combination 26 dBm+26 dBm, its LTE TDD configurations 0 and 6 are not applicable, and the maximum uplink duty cycle of the corresponding NR TDD frequency band is shown in Table 4.

TABLE 4

UL duty cycle configurations for DC frequency band combinations

| LTE UL/DL configurations (UL duty cycle) | 1 (40%) | 2 (20%) | 3 (30%) | 4 (20%) | 5 (10%) |
|---|---|---|---|---|---|
| Default value for UL duty cycle of NR frequency band (10% as granularity) | [10]% | [30]% | [20]% | [30]% | [40]% |

In a possible example, wherein the at least one DC frequency band combination is a frequency band combination that supports the dual transmission mode, and the duplex mode combination is LTE Frequency Division Duplex (FDD)+NR TDD. The HPUE adjusts the uplink transmission configuration of the HPUE according to the transmit power radiation limitation policy, which includes determining by the HPUE through interacting with a network device that the LTE FDD frequency band supports uplink and downlink configurations of the LTE TDD frequency band; determining a maximum uplink duty cycle of the LTE FDD frequency band and a maximum uplink duty cycle of the NR TDD frequency band in each DC frequency band combination; and sending to the network device the maximum uplink duty cycle of the LTE FDD frequency band and the maximum uplink duty cycle of the NR TDD frequency band to adjust the uplink transmission configuration of the HPUE.

Or the HPUE determines through interacting with the network device that the LTE FDD frequency band does not support the uplink and downlink configurations of the LTE TDD frequency band; determines the maximum uplink duty cycle of the NR TDD frequency band in each DC frequency band combination; and sends to the network device the maximum uplink duty cycle of the NR TDD frequency band to adjust the uplink transmission configuration of the HPUE.

If the LTE FDD also supports TDD configurations (scheduled by the base station), the HPUE also needs to limit the maximum uplink duty cycle and report the capability like the NR TDD frequency band.

For the situation in which the LTE FDD frequency band supports the uplink and downlink configurations of the LTE TDD frequency band, HPUE needs to simultaneously limit the maximum uplink duty cycles of the LTE frequency band and the NR frequency band (combination of two duty cycles); for the three situations: 23 dBm+23 dBm, 23 dBm+26 dBm or 26 dBm+26 dBm, the HPUE reports three sets of values, as shown in Table 5.

TABLE 5 maximum UL duty cycle combinations for LTE frequency band and NR frequency band

| maximum UL duty cycle of LTE frequency band | [X1]% | [X2]% | ... |
| maximum UL duty cycle of NR frequency band | [Y1]% | [Y2]% | ... |

For the situation in which the LTE FDD frequency band does not support the uplink and downlink configurations of the LTE TDD frequency band, the worst case is that the HPUE needs to support continuous transmission (100% duty cycle, no additional reporting is required), and the HPUE only needs to report the maximum uplink duty cycle of the NR TDD frequency band. For the two situations: 23 dBm+23 dBm or 23 dBm+26 dBm, the HPUE reports two sets of values, as shown in Table 6.

TABLE 6

| DC frequency band combination (LTE FDD + NR TDD) | 23 dBm + 23 dBm | 23 dBm + 26 dBm |
|---|---|---|
| Maximum UL duty cycle of the NR frequency band | [X]% | [Y]% |

In a possible example, the at least one DC frequency band combination is a frequency band combination that supports a single transmission mode, and the duplex mode combination is LTE FDD+NR TDD. The HPUE adjusts the uplink transmission configuration of the HPUE according to the transmit power radiation limitation policy, including: determining, by the HPUE, that the HPUE is in a dual transmission mode or switches from a single transmission mode to the dual transmission mode; determining, by interacting with a network device, that a LTE FDD frequency band supports uplink and downlink configurations of a LTE TDD frequency band; determining a maximum uplink duty cycle of the LTE FDD frequency band and a maximum uplink duty cycle of the NR TDD frequency band in each DC frequency band combination; sending to the network device the maximum uplink duty cycle of the LTE FDD frequency band and the maximum uplink duty cycle of the NR TDD frequency band to adjust the uplink transmission configuration of the HPUE; or, determining by the HPUE through interacting with the network device, that the LTE FDD frequency band does not support the uplink and downlink configurations of the LTE TDD frequency band; determining the maximum uplink duty cycle of the NR TDD frequency band in each DC frequency band combination; sending to the network device the maximum uplink duty cycle of the NR TDD frequency band to adjust the uplink transmission configuration of the HPUE.

Or the HPUE determines that the HPUE switches from the dual transmission mode to the single transmission mode; if the maximum transmit power combination is 23 dBm+23 dBm, sending from the HPUE to the network device a preset maximum uplink duty cycle of each DC frequency band combination to adjust the uplink transmission configuration of the HPUE Or if the maximum transmit power combination is 23 dBm+26 dBm, and it is confirmed by interacting with the network device that the time division multiplexing mode is configured as a TDD pattern but the HPUE works in the dual transmission mode, sending from the HPUE to the network device maximum uplink duty cycles that are supportable by the LTE FDD frequency band and the NR FDD frequency band in each DC frequency band combination, respectively, to adjust the uplink transmission configuration of the HPUE.

Or if the maximum transmit power combination is 23 dBm+23 dBm or 23 dBm+26 dBm, and the network device configures the TDD pattern but the HPUE works in the single transmission mode, sending from the HPUE to the network device the maximum uplink duty cycle of the NR TDD frequency band in each DC frequency band combination, to adjust the uplink transmission configuration of the HPUE, wherein the maximum uplink duty cycle is configured following the NR TDD frequency band.

Or if it is confirmed by interacting with the network device that no TDD pattern is configured, sending from the HPUE to the network device the maximum uplink duty cycles that are supportable by the LTE FDD frequency band and the NR FDD frequency band in each DC frequency band combination support, respectively, to adjust the uplink transmission configuration of the HPUE.

For the frequency band combination that supports that the single transmission mode: the reporting behavior of the HPUE when the HPUE is in the dual transmission mode is consistent with the above frequency band combinations that support the dual transmission mode.

If the HPUE falls back from the dual transmission mode to the single transmission state (SUO), only an overall uplink duty cycle (one uplink duty cycle) needs to be reported to the network device, and the network device performs scheduling to ensure that the UL duty cycle of the TDM pattern of the NR frequency band and the LTE frequency band does not exceed this uplink duty cycle. Since single transmission mode and TDM-Pattern are both optional, for HPUE that supports the single transmission mode, there are the following situations:

First situation: LTE FDD+NR TDD.

1. For 23 dBm+23 dBm, one value is reported, which can be 100%; if the terminal is in the SUO state when it is connected to the network, the value may not be reported by default, and the network considers by default that there is no restriction for normal UE.

2. For 23 dBm+26 dBm (currently, FDD 26 dBm+TDD 26 dBm is not considered): (1) If the base station configures a TDD pattern but the terminal is working in the dual Tx state, the UE needs to report the capability by default, that is, the UE needs to report the capability about the maximum uplink duty cycles that are supportable by LTE and NR, respectively, in the frequency band combination, as shown in Table 7.

TABLE 7

| LTE (maxUplinkDutyCycle) | [X1]% | [X2]% | ... |
| NR (maxUplinkDutyCycle) | [Y1]% | [Y2]% | ... |

(2) If the base station configures a TDD pattern and the terminal is working in the SUO state, the UE needs to update or report the capability of this frequency band combination, i.e., the maximum uplink duty cycle (such as 50%) of the NR TDD frequency band in the frequency band combination, and this value only needs to follow NR TDD. When the HPUE switches from Dual Tx to SUO or switches from SUO to Dual TX, the terminal needs to update this capability, as shown in Table 8.

TABLE 8

| LTE FDD + NR TDD | 23 dBm + 23 dBm | 23 dBm + 26 dBm |
|---|---|---|
| NR maxUplinkDutyCycle | [X]% | [Y]% |

(3) If the base station does not configure a TDD pattern, the UE needs to report the capability of the maximum uplink duty cycles that can be supported by LTE and NR, respectively, in the frequency band combination, as shown in Table 9.

TABLE 9

| LTE (maxUplinkDutyCycle) | [X1]% | [X2]% | ... |
| NR (maxUplinkDutyCycle) | [Y1]% | [Y2]% | ... |

Second situation: LTE TDD+NR TDD

For 23 dBm+23 dBm, no reporting is required by default.

For 23 dBm+26 dBm, it is needed to report the corresponding maximum uplink duty cycle (such as 40%, generally less than or equal to 50%) of the combination according to different LTE TDD configurations. But the values in the two cases are different.

(1) If the base station configures a TDD pattern and the HPUE is working in the dual transmission mode, the above principles still apply.

(2) If the base station configures a TDD pattern and the HPUE is working in the single transmission mode, or switches from the dual transmission mode to the single transmission mode, or switches from the single transmission mode to the dual transmission mode, the HPUE needs to update this capability, as shown in Table 1.

For 26 dBm+26 dBm, LTE TDD configurations 0 and 6 are not applicable, and the corresponding maximum uplink duty cycle of the combination is reported, as shown in Table 4.

In a possible example, the at least one DC frequency band combination is a frequency band combination that supports a single transmission mode, and the duplex mode combination is LTE TDD+NR TDD; adjusting, by the HPUE, the uplink transmission configuration of the HPUE according to the transmit power radiation limitation policy includes: if the maximum transmit power combination is 23 dBm+23 dBm, adjusting, by the HPUE, the uplink transmission configuration of the HPUE by the HPUE itself, if the maximum transmit power combination is 23 dBm+26 dBm, and it is confirmed by interacting with a network device that a TDD pattern is configured, and the HPUE works in a dual transmission state, sending from the HPUE to the network device a preset maximum uplink duty cycle of each DC frequency band combination to adjust the uplink transmission configuration of the HPUE; if the maximum transmit power combination is 23 dBm+26 dBm, and it is confirmed by interacting with the network device that the TDD pattern is configured, and the HPUE works in the single transmission state or switches from the dual transmission state to the single transmission state or switches from the single transmission state to the dual transmission state, sending from the HPUE to the network device the preset maximum uplink duty cycle of each DC frequency band combination to adjust the uplink transmission configuration of the HPUE; if the maximum transmit power combination is 26 dBm+26 dBm, sending from the HPUE to the network device the preset maximum uplink duty cycle of each DC frequency band combination to adjust the uplink transmission of the HPUE.

In a possible example, determining, by the HPUE, the transmit power radiation limitation policy of the HPUE in the DC mode includes: obtaining, by the HPUE, a transmission mode supported by each DC frequency band combination in the at least one DC frequency band combination supported by the HPUE, and obtaining the duplex mode combination, the maximum transmit power combination and a regional feature of the HPUE; and according to the transmission mode supported by each DC frequency band combination, the duplex mode combination, the maximum transmit power combination and the regional feature, determining the transmit power radiation limitation policy of the HPUE in the DC mode.

The regional feature can be, for example, "network signaling"-NS 01, indicating China Regional 3, US regional1, and there may be different corresponding SAR index requirements and terminal power fallback MPR (Maximum Power Reduction), and different restriction policies may be formulated.

In a possible example, adjusting, by the HPUE, the uplink transmission configuration of the HPUE according to the transmit power radiation limitation policy includes: obtaining, by the HPUE, a preset DC frequency band combination configuration set corresponding to the regional feature; according to the transmission mode supported by each DC frequency band combination, the duplex mode combination, the maximum transmit power combination and the DC frequency band combination configuration set, determining the TDM pattern for a target DC frequency band combination available for the HPUE; and sending to the network device the TDM pattern for the target DC frequency band combination to adjust the uplink transmission configuration of the HPUE.

In a possible example, determining, by the HPUE, the transmit power radiation limitation policy of the HPUE in the DC mode includes: determining, by the HPUE, an autonomous power fallback policy of the HPUE as the transmit power radiation limitation policy in the DC mode.

In a possible example, determining, by the HPUE, the transmit power radiation limitation policy of the HPUE in the DC mode includes: determining, by the HPUE, a power adjustment policy of the HPUE which is based on sensor triggering as the transmit power radiation limitation policy in the DC mode.

As can be seen from above, the present disclosure provides a method for limiting the uplink transmission of a HPUE that supports a LTE+NR DC frequency band combination in a single transmission mode. Regarding the frequency band combinations that the HPUE may support, different duplex working modes, different maximum transmit power combinations, and whether the DC frequency band combinations support the single transmission mode or the dual transmission mode are considered, to formulate corresponding different transmission restriction rules to ensure the electromagnetic radiation requirements of the HPUE.

In addition, HPUE generally has a self-implemented sensor-based power back-off mechanism to meet the electromagnetic radiation requirements, and the present disclosure mainly assists in meeting the requirements from the perspective of network-side scheduling to limit the uplink transmission, which improves the reliability of the HPUE, and simplifies the design of the HPUE to some extent, and can even reduce the costs associated with sensors.

The following is a further description of the implementations from the network device side. A High Power User Equipment (HPUE) supporting a Dual Connectivity (DC) mode is included within a signal coverage range of the network device. The DC mode refers to dual connectivity based on a DC frequency band combination, and the DC frequency band combination includes a Long Term Evolution (LTE) frequency band and a New Radio (NR) frequency band. The network device performs the following operations: receiving from the HPUE a maximum uplink duty cycle of a NR Time Division Duplex (TDD) frequency band corresponding to a LTE TDD frequency band to adjust an uplink transmission configuration of the HPUE, wherein the maximum uplink duty cycle of the NR TDD frequency band corresponding to the LTE TDD frequency is obtained by the HPUE by performing the following operations: obtaining a transmission mode supported by each DC frequency band combination in at least one DC frequency band combination supported by the HPUE, and obtaining a duplex mode combination and a maximum transmit power combination of the HPUE; and according to the transmission mode supported by each DC frequency band combination, the duplex mode combination and the maximum transmit power combination, determining a transmit power radiation limitation policy of the HPUE in the DC mode; and obtaining a configuration of the LTE TDD frequency band in each DC frequency band combination; and querying a preset uplink duty cycle configuration table to determine the maximum uplink duty cycle of the NR TDD frequency band corresponding to the LTE TDD frequency band, wherein the uplink duty cycle configuration table includes correspondence relationships between maximum uplink duty cycles of LTE TDD frequency bands and maximum uplink duty cycles of NR TDD frequency bands constrained by the maximum transmit power combination, wherein the at least one DC frequency band combination is a frequency band combination that supports a dual transmission mode, and the duplex mode combination is LTE TDD+NR TDD.

Or the network device performs the following operations: receiving from the HPUE a maximum uplink duty cycle of the LTE FDD frequency band and a maximum uplink duty cycle of the NR TDD frequency band in each DC frequency band combination to adjust the uplink transmission configuration of the HPUE, wherein the maximum uplink duty cycle of the LTE FDD frequency band and the maximum uplink duty cycle of the NR TDD frequency band are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the LTE FDD frequency band supports uplink and downlink configurations of a LTE TDD frequency band, wherein the at least one DC frequency band combination is a frequency band combination that supports the dual transmission mode, and the duplex mode combination is LTE TDD+NR TDD.

Or the network device performs the following operations: receiving from the HPUE the maximum uplink duty cycle of the NR TDD frequency band to adjust the uplink transmission configuration of the HPUE, wherein the maximum uplink duty cycle of the NR TDD frequency band is determined by the HPUE after performing the following operations: obtaining the transmission mode supported by each DC frequency band combination in the at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the LTE FDD frequency band does not support the uplink and downlink configurations of the LTE TDD frequency band, wherein the at least one DC frequency band combination is a frequency band combination that supports the dual transmission mode, and the duplex mode combination is LTE TDD+NR TDD.

Or the network device performs the following operations: receiving from the HPUE the maximum uplink duty cycle of the LTE FDD frequency band and the maximum uplink duty cycle of the NR TDD frequency band in each DC frequency band combination to adjust the uplink transmission of the HPUE, wherein the maximum uplink duty cycle of the LTE FDD frequency band and the maximum uplink duty cycle of the NR TDD frequency band are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE is in the dual transmission mode or switches from the single transmission mode to the dual transmission mode; determining, by interacting with the network device, that the LTE FDD frequency band supports the uplink and downlink configurations of the LTE TDD frequency band, wherein the at least one DC frequency band combination is a frequency band combination that supports the single transmission mode, and the duplex mode combination is LTE FDD+NR TDD.

Or the network device performs the following operations: receiving from the HPUE the maximum uplink duty cycle of the NR TDD frequency band in each DC frequency band combination to adjust the uplink transmission configuration of the HPUE, wherein the maximum uplink duty cycle of the NR TDD frequency band is determined by the HPUE after performing the following operations: obtaining the transmission mode supported by each DC frequency band combination in the at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE is in the dual transmission mode or switches from the single transmission mode to the dual transmission mode; and determining, by interacting with the network device, that the LTE FDD frequency band does not support the uplink and downlink configurations of the LTE TDD frequency band, wherein the at least one DC frequency band combination is a frequency band combination that supports the single transmission mode, and the duplex mode combination is LTE FDD+NR TDD.

Or the network device performs the following operations: receiving from the HPUE a preset maximum uplink duty cycle of each DC frequency band combination to adjust the uplink transmission configuration of the HPUE, wherein the preset maximum uplink duty cycle of each DC frequency band combination is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE switches from the dual transmission mode to the single transmission mode; and determining that the maximum transmit power combination of the HPUE is 23 dBm+23 dBm, wherein the at least one DC frequency band combination is a frequency band combination that supports the single transmission mode, and the duplex mode combination is LTE FDD+NR TDD.

Or the network device performs the following operations: receiving from the HPUE maximum uplink duty cycles that are supportable by the LTE FDD frequency band and the NR FDD frequency band in each DC frequency band combination, respectively, to adjust the uplink transmission configuration of the HPUE, wherein the maximum uplink duty cycles that are supportable by the LTE FDD frequency band and the NR FDD frequency band are sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and confirming that the maximum transmit power combination is 23 dBm+26 dBm, and confirming by interacting with the network device that the TDD pattern is configured as the time division multiplexing pattern but the HPUE works in the dual transmission mode.

Or the network device performs the following operations: receiving from the HPUE the maximum uplink duty cycle of the NR TDD frequency band in each DC frequency band combination to adjust the uplink transmission configuration of the HPUE, wherein the maximum uplink duty cycle of the NR TDD frequency band is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination of the HPUE is 23 dBm+23 dBm or 23 dBm+26 dBm and the network device configures the TDD pattern but the HPUE works in the single transmission mode, wherein the at least one DC frequency band combination is a frequency band that supports the single transmission mode, and the duplex mode combination is LTE FDD+NR TDD.

Or the network device performs the following operations: receiving from the HPUE the maximum uplink duty cycles that are supportable by the LTE FDD frequency band and the NR FDD frequency band in each DC frequency band combination support, respectively, to adjust the uplink transmission configuration of the HPUE, wherein the maximum uplink duty cycles that are supportable by the LTE FDD frequency band and the NR FDD frequency band in each DC frequency band combination, respectively, are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; confirming, by interacting with the network device, that no TDD pattern is configured, wherein the at least one DC frequency band combination is a frequency band combination that supports the single transmission mode, and the duplex mode combination is LTE FDD+NR TDD.

Or the network device performs the following operations: receiving from the HPUE the preset maximum uplink duty cycle of each DC frequency band combination to adjust the uplink transmission configuration of the HPUE, wherein the preset maximum uplink duty cycle of each DC frequency band combination is determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; determining that the maximum transmit power combination is 23 dBm+23 dBm, and confirming, by interacting with the network device, that the TDD pattern is configured and the HPUE words in the dual transmission state, wherein the least one DC frequency band combination is a frequency band combination that supports the single transmission mode, and the duplex mode combination is LTE TDD+NR TDD.

Or the network device performs the following operations: receiving from the HPUE the preset maximum uplink duty cycle of each DC frequency band combination to adjust the uplink transmission configuration of the HPUE, wherein the preset maximum uplink duty cycle of each DC frequency band combination is determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination is 23 dBm+26 dBm, and confirming, by interacting with the network device, that the TDD pattern is configured and the HPUE works in the single transmission state or switches from the dual transmission state to the single transmission state or switches from the single transmission state to the dual transmission state, wherein the at least one DC frequency is a frequency band combination that supports the single transmission mode, and the duplex mode combination is LTE TDD+NR TDD.

Or the network device performs the following operations: receiving from the HPUE the preset maximum uplink duty cycle of each DC frequency band combination to adjust the uplink transmission configuration of the HPUE, wherein the preset maximum uplink duty cycle of each DC frequency band combination is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination is 26 dBm+26 dBm, wherein the at least one DC frequency is a frequency band combination that supports the single transmission mode, and the duplex mode combination is LTE TDD+NR TDD.

Or the network device performs the following operations: receiving from the HPUE the Time Division Multiplexing (TDM) pattern for a target DC frequency band combination for the HPUE to adjust the uplink transmission configuration of the HPUE, wherein the TDM pattern for the target DC frequency band combination is sent by the HPUE after performing the following operations: obtaining the transmission mode supported by each DC frequency band combination in the at least one DC frequency band combination supported by the HPUE, and obtaining the duplex mode combination, the maximum transmit power combination and a regional feature of the HPUE; and according to the transmission mode supported by each DC frequency band combination, the duplex mode combination, the maximum transmit power combination and the regional feature, determining the transmit power radiation limitation policy of the HPUE in the DC mode; and obtaining a preset DC frequency band combination configuration set corresponding to the regional features; and according to the transmission mode supported by each DC frequency band combination, the duplex mode combination, the maximum transmit power combination, and the DC frequency band combination configuration set, determining the TDM pattern for the target DC frequency band combination available for the HPUE.

In the embodiment, the high power terminal first determines the transmission power radiation limitation policy of the high power terminal in the DC mode, and then adjusts the uplink transmission configuration of the high power terminal according to the transmission power radiation limitation policy. The uplink transmission configuration includes a Time Division Multiplexing (TDM) pattern for the DC frequency band combination or a maximum uplink duty cycle of the LTE frequency band and/or the NR frequency band in the DC frequency band combination. The high power terminal supports a Dual Connectivity (DC) mode, and the DC mode refers to dual connectivity based on the DC frequency band combination, and the DC frequency band combination includes a Long Term Evolution (LTE) frequency band and a New Radio (NR) frequency band. It can be seen that the high power terminal in embodiments of the present disclosure can dynamically determine the transmission power radiation limitation policy in the DC mode, and adjust the local uplink transmission configuration according to the transmission power radiation limitation policy, that is, flexibly set the transmission restriction rules, so that the electromagnetic radiation requirements of the high power terminal in the uplink transmission procedure can be guaranteed.

Figure 3:
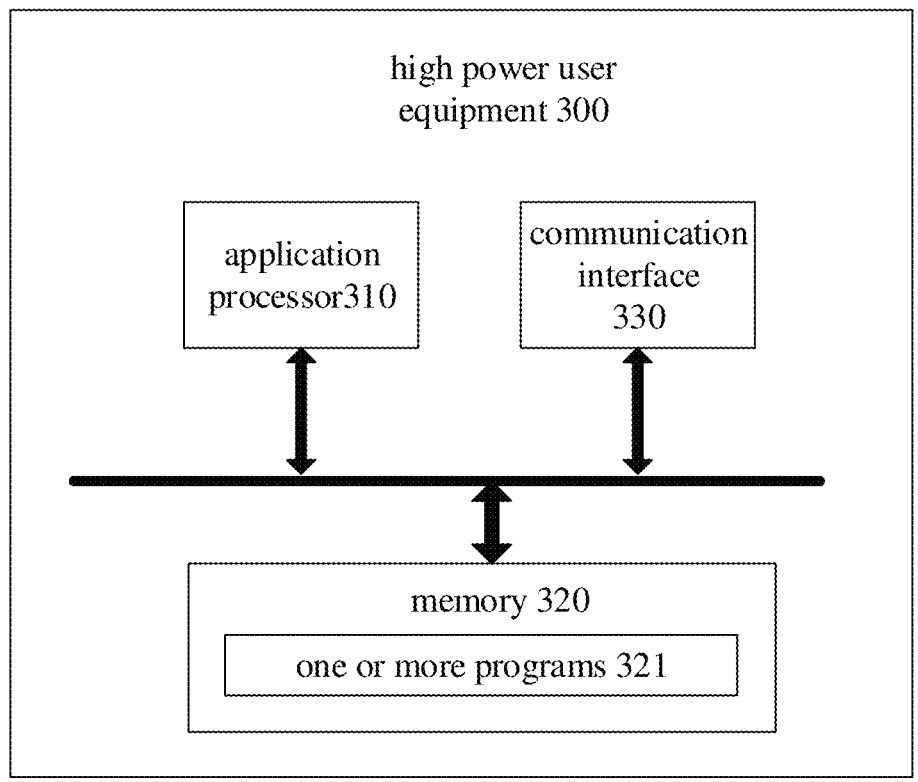
FIG. 3 is a schematic structural diagram of a high power terminal according to an embodiment of the present disclosure.

Consistent with the embodiment shown in FIG. 2 above, FIG. 3 is a schematic structural diagram of a HPUE 300 according to an embodiment of the present disclosure. As shown in the figure, the HPUE 300 includes a processor 310, a memory 320, a communication interface 330, and one or more programs 321. The one or more programs 321 are stored in the memory 320 and are configured to be executed by the processor 310, and the one or more programs 321 include instructions for performing the following steps: determining a transmit power radiation limitation policy of the HPUE in the DC mode; and adjusting an uplink transmission configuration of the HPUE according to the transmit power radiation limitation policy, wherein the uplink transmission configuration includes a Time Division Multiplexing (TDM) pattern for the DC frequency band combination or a maximum uplink duty cycle of the LTE frequency band and/or the NR frequency band in the DC frequency band combination.

As can be seen from above, in embodiments of the present disclosure, the high power terminal first determines the transmission power radiation limitation policy of the high power terminal in the DC mode, and then adjusts the uplink transmission configuration of the high power terminal according to the transmission power radiation limitation policy. The uplink transmission configuration includes a Time Division Multiplexing (TDM) pattern for the DC frequency band combination or a maximum uplink duty cycle of the LTE frequency band and/or the NR frequency band in the DC frequency band combination. The high power terminal supports a Dual Connectivity (DC) mode, and the DC mode refers to dual connectivity based on the DC frequency band combination, and the DC frequency band combination includes a Long Term Evolution (LTE) frequency band and a New Radio (NR) frequency band. It can be seen that the high power terminal in embodiments of the present disclosure can dynamically determine the transmission power radiation limitation policy in the DC mode, and adjust the local uplink transmission configuration according to the transmission power radiation limitation policy, that is, flexibly set the transmission restriction rules, so that the electromagnetic radiation requirements of the high power terminal in the uplink transmission procedure can be guaranteed.

In a possible example, in terms of determining the transmit power radiation limitation policy of the HPUE in the DC mode, the instructions in the programs are configured to perform the following operations: obtaining a transmission mode supported by each DC frequency band combination in at least one DC frequency band combination supported by the HPUE, and obtaining a duplex mode combination and a maximum transmit power combination of the HPUE; and according to the transmission mode supported by each DC frequency band combination, the duplex mode combination and the maximum transmit power combination, determining the transmit power radiation limitation policy of the HPUE in the DC mode.

In a possible example, the at least one DC frequency band combination is a frequency band combination that supports a dual transmission mode, and the duplex mode combination is LTE Time Division Duplex (TDD)+NR TDD.

In terms of adjusting the uplink transmission configuration of the HPUE according to the transmit power radiation limitation policy, the instructions in the programs are configured to perform the following operations: obtaining a configuration of a LTE TDD frequency band in each DC frequency band combination; querying a preset uplink duty cycle configuration table to determine a maximum uplink duty cycle of a NR TDD frequency band corresponding to the LTE TDD frequency band, wherein the uplink duty cycle configuration table includes correspondence relationships between maximum uplink duty cycles of LTE TDD frequency bands and maximum uplink duty cycles of NR TDD frequency bands constrained by the maximum transmit power combination; and sending to a network device the maximum uplink duty cycle of the NR TDD frequency band corresponding to the LTE TDD frequency band to adjust the uplink transmission configuration of the HPUE.

In a possible example, the at least one DC frequency band combination is a frequency band combination that supports a dual transmission mode, and the duplex mode combination is LTE Frequency Division Duplex (FDD)+NR TDD.

In terms of adjusting the uplink transmission configuration of the HPUE according to the transmit power radiation limitation policy, the instructions in the programs are configured to perform the following operations: determining, by interacting with a network device, that a LTE FDD frequency band supports uplink and downlink configurations of a LTE TDD frequency band; determining a maximum uplink duty cycle of the LTE FDD frequency band and a maximum uplink duty cycle of the NR TDD frequency band in each DC frequency band combination; and sending to the network device the maximum uplink duty cycle of the LTE FDD frequency band and the maximum uplink duty cycle of the NR TDD frequency band to adjust the uplink transmission configuration of the HPUE.

Or the network device performs the following operations: determining, by interacting with the network device, that the LTE FDD frequency band does not support the uplink and downlink configurations of the LTE TDD frequency band; determining the maximum uplink duty cycle of the NR TDD frequency band in each DC frequency band combination; and sending to the network device the maximum uplink duty cycle of the NR TDD frequency band to adjust the uplink transmission configuration of the HPUE.

In a possible example, the at least one DC frequency band combination is a frequency band combination that supports a single transmission mode, and the duplex mode combination is LTE FDD+NR TDD; in terms of adjusting the uplink transmission configuration of the HPUE according to the transmit power radiation limitation policy, the instructions in the programs are configured to perform the following operations: determining that the HPUE is in a dual transmission mode or switches from a single transmission mode to the dual transmission mode; determining, by interacting with a network device, that a LTE FDD frequency band supports uplink and downlink configurations of a LTE TDD frequency band; determining a maximum uplink duty cycle of the LTE FDD frequency band and a maximum uplink duty cycle of the NR TDD frequency band in each DC frequency band combination; sending to the network device the maximum uplink duty cycle of the LTE FDD frequency band and the maximum uplink duty cycle of the NR TDD frequency band to adjust the uplink transmission configuration of the HPUE; or, determining, by interacting with the network device, that the LTE FDD frequency band does not support the uplink and downlink configurations of the LTE TDD frequency band; determining the maximum uplink duty cycle of the NR TDD frequency band in each DC frequency band combination; sending to the network device the maximum uplink duty cycle of the NR TDD frequency band to adjust the uplink transmission configuration of the HPUE.

Or the network device performs the following operations: determining that the HPUE switches from the dual transmission mode to the single transmission mode; if the maximum transmit power combination is 23 dBm+23 dBm, sending to the network device a preset maximum uplink duty cycle of each DC frequency band combination to adjust the uplink transmission configuration of the HPUE.

Or the network device performs the following operations: if the maximum transmit power combination is 23 dBm+26 dBm, and it is confirmed by interacting with the network device that the time division multiplexing mode is configured as a TDD pattern but the HPUE works in the dual transmission mode, sending to the network device maximum uplink duty cycles that are supportable by the LTE FDD frequency band and the NR FDD frequency band in each DC frequency band combination, respectively, to adjust the uplink transmission configuration of the HPUE.

Or the network device performs the following operations: if the maximum transmit power combination is 23 dBm+23 dBm or 23 dBm+26 dBm, and the network device configures the TDD pattern but the HPUE works in the single transmission mode, sending to the network device the maximum uplink duty cycle of the NR TDD frequency band in each DC frequency band combination, to adjust the uplink transmission configuration of the HPUE, wherein the maximum uplink duty cycle is configured following the NR TDD frequency band.

Or the network device performs the following operations: if it is confirmed by interacting with the network device that no TDD pattern is configured, sending to the network device the maximum uplink duty cycles that are supportable by the LTE FDD frequency band and the NR FDD frequency band in each DC frequency band combination support, respectively, to adjust the uplink transmission configuration of the HPUE.

In a possible example, the at least one DC frequency band combination is a frequency band combination that supports a single transmission mode, and the duplex mode combination is LTE TDD+NR TDD.

In terms of adjusting the uplink transmission configuration of the HPUE according to the transmit power radiation limitation policy, the instructions in the programs are configured to perform the following operations: if the maximum transmit power combination is 23 dBm+23 dBm, adjusting the uplink transmission configuration of the HPUE by the HPUE itself, if the maximum transmit power combination is 23 dBm+26 dBm, and it is confirmed by interacting with a network device that a TDD pattern is configured, and the HPUE works in a dual transmission state, sending to the network device a preset maximum uplink duty cycle of each DC frequency band combination to adjust the uplink transmission configuration of the HPUE; if the maximum transmit power combination is 23 dBm+26 dBm, and it is confirmed by interacting with the network device that the TDD pattern is configured, and the HPUE works in the single transmission state or switches from the dual transmission state to the single transmission state or switches from the single transmission state to the dual transmission state, sending to the network device the preset maximum uplink duty cycle of each DC frequency band combination to adjust the uplink transmission configuration of the HPUE; if the maximum transmit power combination is 26 dBm+26 dBm, sending to the network device the preset maximum uplink duty cycle of each DC frequency band combination to adjust the uplink transmission of the HPUE.

In a possible example, in terms of determining the transmit power radiation limitation policy of the HPUE in the DC mode, the instructions in the programs are configured to perform the following operations: obtaining a transmission mode supported by each DC frequency band combination in the at least one DC frequency band combination supported by the HPUE, and obtaining the duplex mode combination, the maximum transmit power combination and a regional feature of the HPUE; and according to the transmission mode supported by each DC frequency band combination, the duplex mode combination, the maximum transmit power combination and the regional feature, determining the transmit power radiation limitation policy of the HPUE in the DC mode.

In a possible example, in terms of adjusting the uplink transmission configuration of the HPUE according to the transmit power radiation limitation policy, the instructions in the programs are configured to perform the following operations: obtaining a preset DC frequency band combination configuration set corresponding to the regional feature; according to the transmission mode supported by each DC frequency band combination, the duplex mode combination, the maximum transmit power combination and the DC frequency band combination configuration set, determining the TDM pattern for a target DC frequency band combination available for the HPUE; and sending to the network device the TDM pattern for the target DC frequency band combination to adjust the uplink transmission configuration of the HPUE.

In a possible example, in terms of determining the transmit power radiation limitation policy of the HPUE in the DC mode, the instructions in the programs are configured to perform the following operations: determining an autonomous power fallback policy of the HPUE as the transmit power radiation limitation policy in the DC mode.

In a possible example, in terms of determining the transmit power radiation limitation policy of the HPUE in the DC mode, the instructions in the programs are configured to perform the following operations: determining a power adjustment policy of the HPUE which is based on sensor triggering as the transmit power radiation limitation policy in the DC mode.

Figure 4:
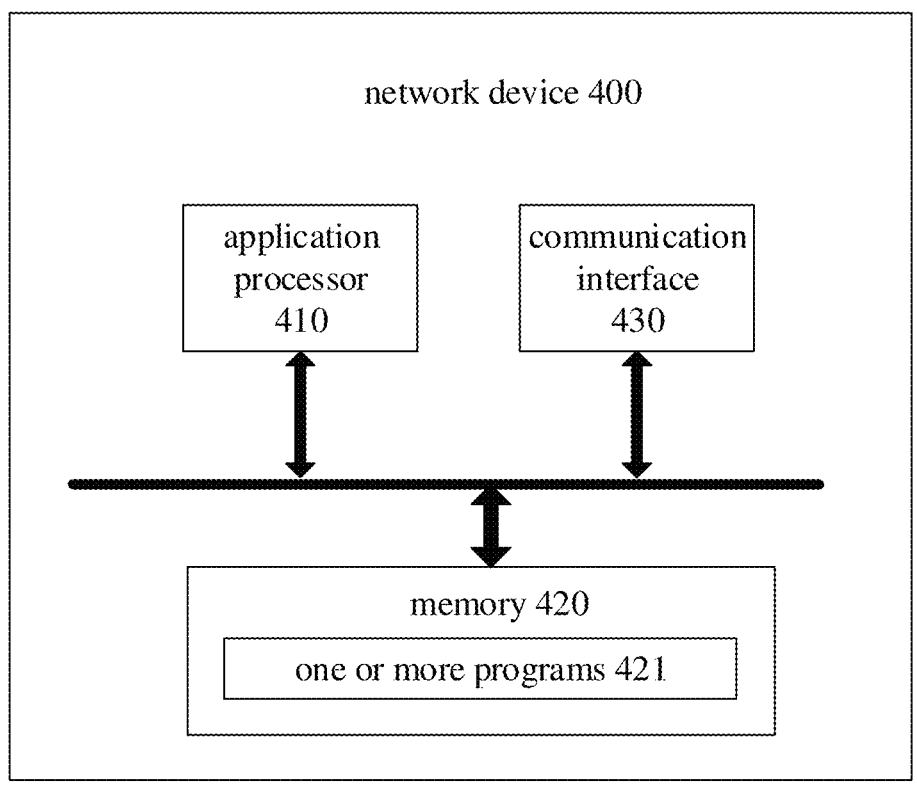
FIG. 4 is a schematic structural diagram of a network device according to an embodiment of the present disclosure.

FIG. 4 is a schematic structural diagram of a network device 400 according to an embodiment of the present disclosure. As shown in the figure, the network device 400 includes a processor 410, a memory 420, a communication interface 430, and one or more programs 421. The one or more programs 421 are stored in the memory 420 and configured to be executed by the processor 410, and the one or more programs 421 include instructions configured to perform the following steps; receiving from the HPUE a maximum uplink duty cycle of a NR Time Division Duplex (TDD) frequency band corresponding to a LTE TDD frequency band to adjust an uplink transmission configuration of the HPUE, wherein the maximum uplink duty cycle of the NR TDD frequency band corresponding to the LTE TDD frequency is obtained by the HPUE by performing the following operations: obtaining a transmission mode supported by each DC frequency band combination in at least one DC frequency band combination supported by the HPUE, and obtaining a duplex mode combination and a maximum transmit power combination of the HPUE; and according to the transmission mode supported by each DC frequency band combination, the duplex mode combination and the maximum transmit power combination, determining a transmit power radiation limitation policy of the HPUE in the DC mode; and obtaining a configuration of the LTE TDD frequency band in each DC frequency band combination; and querying a preset uplink duty cycle configuration table to determine the maximum uplink duty cycle of the NR TDD frequency band corresponding to the LTE TDD frequency band, wherein the uplink duty cycle configuration table includes correspondence relationships between maximum uplink duty cycles of LTE TDD frequency bands and maximum uplink duty cycles of NR TDD frequency bands constrained by the maximum transmit power combination, wherein the at least one DC frequency band combination is a frequency band combination that supports a dual transmission mode, and the duplex mode combination is LTE TDD+NR TDD.

Or the network device performs the following operations: receiving from the HPUE a maximum uplink duty cycle of the LTE FDD frequency band and a maximum uplink duty cycle of the NR TDD frequency band in each DC frequency band combination to adjust the uplink transmission configuration of the HPUE, wherein the maximum uplink duty cycle of the LTE FDD frequency band and the maximum uplink duty cycle of the NR TDD frequency band are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the LTE FDD frequency band supports uplink and downlink configurations of a LTE TDD frequency band, wherein the at least one DC frequency band combination is a frequency band combination that supports the dual transmission mode, and the duplex mode combination is LTE TDD+NR TDD.

Or the network device performs the following operations: receiving from the HPUE the maximum uplink duty cycle of the NR TDD frequency band to adjust the uplink transmission configuration of the HPUE, wherein the maximum uplink duty cycle of the NR TDD frequency band is determined by the HPUE after performing the following operations: obtaining the transmission mode supported by each DC frequency band combination in the at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the LTE FDD frequency band does not support the uplink and downlink configurations of the LTE TDD frequency band, wherein the at least one DC frequency band combination is a frequency band combination that supports the dual transmission mode, and the duplex mode combination is LTE TDD+NR TDD.

Or the network device performs the following operations: receiving from the HPUE the maximum uplink duty cycle of the LTE FDD frequency band and the maximum uplink duty cycle of the NR TDD frequency band in each DC frequency band combination to adjust the uplink transmission of the HPUE, wherein the maximum uplink duty cycle of the LTE FDD frequency band and the maximum uplink duty cycle of the NR TDD frequency band are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE is in the dual transmission mode or switches from the single transmission mode to the dual transmission mode; determining, by interacting with the network device, that the LTE FDD frequency band supports the uplink and downlink configurations of the LTE TDD frequency band, wherein the at least one DC frequency band combination is a frequency band combination that supports the single transmission mode, and the duplex mode combination is LTE FDD+NR TDD.

Or the network device performs the following operations: receiving from the HPUE the maximum uplink duty cycle of the NR TDD frequency band in each DC frequency band combination to adjust the uplink transmission configuration of the HPUE, wherein the maximum uplink duty cycle of the NR TDD frequency band is determined by the HPUE after performing the following operations: obtaining the transmission mode supported by each DC frequency band combination in the at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE is in the dual transmission mode or switches from the single transmission mode to the dual transmission mode; and determining, by interacting with the network device, that the LTE FDD frequency band does not support the uplink and downlink configurations of the LTE TDD frequency band, wherein the at least one DC frequency band combination is a frequency band combination that supports the single transmission mode, and the duplex mode combination is LTE FDD+NR TDD.

Or the network device performs the following operations: receiving from the HPUE a preset maximum uplink duty cycle of each DC frequency band combination to adjust the uplink transmission configuration of the HPUE, wherein the preset maximum uplink duty cycle of each DC frequency band combination is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE switches from the dual transmission mode to the single transmission mode; and determining that the maximum transmit power combination of the HPUE is 23 dBm+23 dBm, wherein the at least one DC frequency band combination is a frequency band combination that supports the single transmission mode, and the duplex mode combination is LTE FDD+NR TDD.

Or the network device performs the following operations: receiving from the HPUE maximum uplink duty cycles that are supportable by the LTE FDD frequency band and the NR FDD frequency band in each DC frequency band combination, respectively, to adjust the uplink transmission configuration of the HPUE, wherein the maximum uplink duty cycles that are supportable by the LTE FDD frequency band and the NR FDD frequency band are sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and confirming that the maximum transmit power combination is 23 dBm+

26 dBm, and confirming by interacting with the network device that the TDD pattern is configured as the time division multiplexing pattern but the HPUE works in the dual transmission mode.

Or the network device performs the following operations receiving from the HPUE the maximum uplink duty cycle of the NR TDD frequency band in each DC frequency band combination to adjust the uplink transmission configuration of the HPUE, wherein the maximum uplink duty cycle of the NR TDD frequency band is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination of the HPUE is 23 dBm+23 dBm or 23 dBm+26 dBm and the network device configures the TDD pattern but the HPUE works in the single transmission mode, wherein the at least one DC frequency band combination is a frequency band that supports the single transmission mode, and the duplex mode combination is LTE FDD+NR TDD.

Or the network device performs the following operations: receiving from the HPUE the maximum uplink duty cycles that are supportable by the LTE FDD frequency band and the NR FDD frequency band in each DC frequency band combination support, respectively, to adjust the uplink transmission configuration of the HPUE, wherein the maximum uplink duty cycles that are supportable by the LTE FDD frequency band and the NR FDD frequency band in each DC frequency band combination, respectively, are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; confirming, by interacting with the network device, that no TDD pattern is configured, wherein the at least one DC frequency band combination is a frequency band combination that supports the single transmission mode, and the duplex mode combination is LTE FDD+NR TDD.

Or the network device performs the following operations: receiving from the HPUE the preset maximum uplink duty cycle of each DC frequency band combination to adjust the uplink transmission configuration of the HPUE, wherein the preset maximum uplink duty cycle of each DC frequency band combination is determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; determining that the maximum transmit power combination is 23 dBm+23 dBm, and confirming, by interacting with the network device, that the TDD pattern is configured and the HPUE works in the dual transmission state, wherein the least one DC frequency band combination is a frequency band combination that supports the single transmission mode, and the duplex mode combination is LTE TDD+NR TDD.

Or the network device performs the following operations: receiving from the HPUE the preset maximum uplink duty cycle of each DC frequency band combination to adjust the uplink transmission configuration of the HPUE, wherein the preset maximum uplink duty cycle of each DC frequency band combination is determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination is 23 dBm+ 26 dBm, and confirming, by interacting with the network device, that the TDD pattern is configured and the HPUE works in the single transmission state or switches from the dual transmission state to the single transmission state or switches from the single transmission state to the dual transmission state, wherein the at least one DC frequency is a frequency band combination that supports the single transmission mode, and the duplex mode combination is LTE TDD+NR TDD.

Or the network device performs the following operations: receiving from the HPUE the preset maximum uplink duty cycle of each DC frequency band combination to adjust the uplink transmission configuration of the HPUE, wherein the preset maximum uplink duty cycle of each DC frequency band combination is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination is 26 dBm+26 dBm, wherein the at least one DC frequency is a frequency band combination that supports the single transmission mode, and the duplex mode combination is LTE TDD+NR TDD.

Or the network device performs the following operations: receiving from the HPUE the Time Division Multiplexing (TDM) pattern for a target DC frequency band combination for the HPUE to adjust the uplink transmission configuration of the HPUE, wherein the TDM pattern for the target DC frequency band combination is sent by the HPUE after performing the following operations: obtaining the transmission mode supported by each DC frequency band combination in the at least one DC frequency band combination supported by the HPUE, and obtaining the duplex mode combination, the maximum transmit power combination and a regional feature of the HPUE; and according to the transmission mode supported by each DC frequency band combination, the duplex mode combination, the maximum transmit power combination and the regional feature, determining the transmit power radiation limitation policy of the HPUE in the DC mode; and obtaining a preset DC frequency band combination configuration set corresponding to the regional features; and according to the transmission mode supported by each DC frequency band combination, the duplex mode combination, the maximum transmit power combination, and the DC frequency band combination configuration set, determining the TDM pattern for the target DC frequency band combination available for the HPUE.

As can be seen from above, in embodiments of the present disclosure, the high power terminal first determines the transmission power radiation limitation policy of the high power terminal in the DC mode, and then adjusts the uplink transmission configuration of the high power terminal according to the transmission power radiation limitation policy. The uplink transmission configuration includes a Time Division Multiplexing (TDM) pattern for the DC frequency band combination or a maximum uplink duty cycle of the LTE frequency band and/or the NR frequency band in the DC frequency band combination. The high power terminal supports a Dual Connectivity (DC) mode, and the DC mode refers to dual connectivity based on the DC frequency band combination, and the DC frequency band combination includes a Long Term Evolution (LTE) frequency band and a New Radio (NR) frequency band. It can be seen that the high power terminal in embodiments of the present disclosure can dynamically determine the transmission power radiation limitation policy in the DC mode, and adjust the local uplink transmission configuration according to the transmission power radiation limitation policy, that is, flexibly set the transmission restriction rules, so that the electromagnetic radiation requirements of the high power terminal in the uplink transmission procedure can be guaranteed.

The foregoing mainly describes the solutions provided by embodiments of the present disclosure from the perspective of interaction between various network elements. It can be understood that, in order to implement the above-mentioned functions, the terminal includes hardware structures and/or software modules corresponding to each function. Those skilled in the art should easily realize that units and algorithm steps of the examples described in embodiments disclosed herein can be implemented in the form of hardware or a combination of hardware and computer software. Whether a certain function is implemented by hardware or by hardware driven by computer software depends on the specific application and design constraint conditions of the technical solutions. Those skilled in this art can use different methods for each specific application to implement the described functions, but such implementation should not be considered as going beyond the scope of the present disclosure.

In embodiments of the present disclosure, the terminal may be divided into functional units according to the foregoing method embodiments. For example, functional units may be divided corresponding to functions, or two or more functions may be integrated into one processing unit. The integrated unit can be implemented in the form of hardware or software program module. It should be noted that the division of units in the embodiments of the present disclosure is illustrative, and is only a logical function division, and there may be other division methods in actual implementation.

Figure 5:
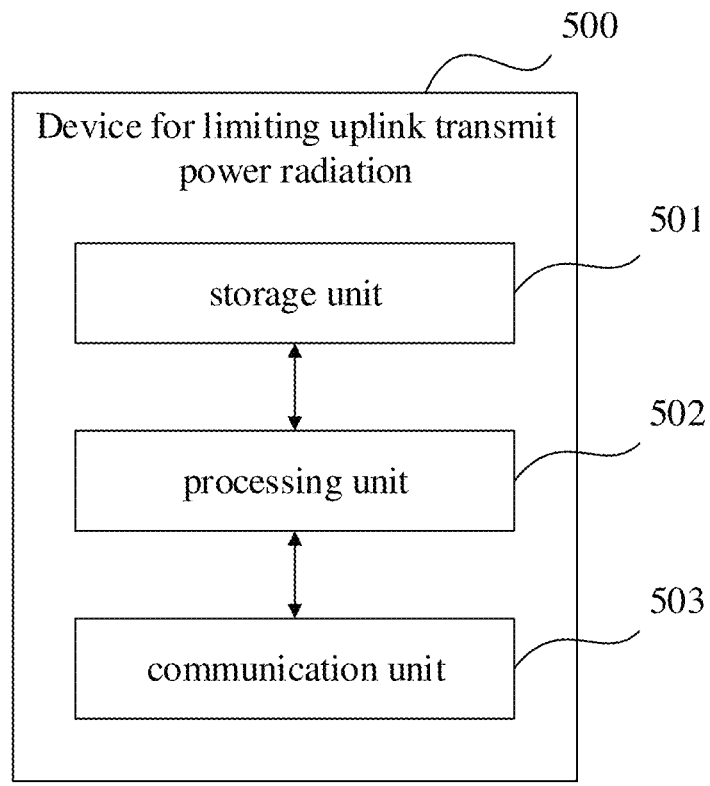
FIG. 5 is a block diagram showing functional units of a device for limiting uplink transmit power radiation according to an embodiment of the present disclosure.

In the case of using an integrated unit, FIG. 5 shows a block diagram of a possible functional unit composition of the device for limiting uplink transmission power radiation involved in the foregoing embodiments. The device 500 for limiting uplink transmit power radiation is a High Power User Equipment (HPUE) supporting a Dual Connectivity (DC) mode. The DC mode refers to dual connectivity based on a DC frequency band combination, the DC frequency band combination includes a Long Term Evolution (LTE) frequency band and a New Radio (NR) frequency band. The device 500 includes a processing unit 502 and a communication unit 503. The processing unit 502 is used to control and manage the actions of the HPUE. For example, the processing unit 502 is used to support the terminal to perform steps 201 and 202 in FIG. 2 and/or other processes used herein. The communication unit 503 is used to support communications between the HPUE and other devices. The HPUE may further include a storage unit 501 for storing program codes and data of the HPUE.

The processing unit 502 may be a processor or a controller, for example, a Central Processing Unit (CPU), a general-purpose processor, a Digital Signal Processor (DSP), an Application-Specific Integrated Circuit (ASIC), a Field Programmable Gate Array (FPGA) or other programmable logic device, a transistor logic device, a hardware component or any combination thereof. The processing unit 502 can implement or execute various exemplary logical blocks, modules, and circuits described in embodiments of the present disclosure. The processor may also be a combination for realizing computing functions, for example, including a combination of one or more microprocessors, a combination of a DSP and a microprocessor, and so on. The communication unit 503 may be a communication interface, a transceiver, a transceiver circuit, and so on. The storage unit 501 may be a memory.

The processing unit 502 is configured to determine a transmit power radiation limitation policy of the HPUE in the DC mode; and adjust via the communication unit 503 an uplink transmission configuration of the HPUE according to the transmit power radiation limitation policy, wherein the uplink transmission configuration includes a Time Division Multiplexing (TDM) pattern for the DC frequency band combination or a maximum uplink duty cycle of the LTE frequency band and/or the NR frequency band in the DC frequency band combination.

As can be seen from above, in embodiments of the present disclosure, the high power terminal first determines the transmission power radiation limitation policy of the high power terminal in the DC mode, and then adjusts the uplink transmission configuration of the high power terminal according to the transmission power radiation limitation policy. The uplink transmission configuration includes a Time Division Multiplexing (TDM) pattern for the DC frequency band combination or a maximum uplink duty cycle of the LTE frequency band and/or the NR frequency band in the DC frequency band combination. The high power terminal supports a Dual Connectivity (DC) mode, and the DC mode refers to dual connectivity based on the DC frequency band combination, and the DC frequency band combination includes a Long Term Evolution (LTE) frequency band and a New Radio (NR) frequency band. It can be seen that the high power terminal in embodiments of the present disclosure can dynamically determine the transmission power radiation limitation policy in the DC mode, and adjust the local uplink transmission configuration according to the transmission power radiation limitation policy, that is, flexibly set the transmission restriction rules, so that the electromagnetic radiation requirements of the high power terminal in the uplink transmission procedure can be guaranteed.

In a possible example, in terms of determining the transmit power radiation limitation policy of the HPUE in the DC mode, the processing unit 502 is configured to: obtain a transmission mode supported by each DC frequency band combination in at least one DC frequency band combination supported by the HPUE, and obtain a duplex mode combination and a maximum transmit power combination of the HPUE; and according to the transmission mode supported by each DC frequency band combination, the duplex mode combination and the maximum transmit power combination, determine the transmit power radiation limitation policy of the HPUE in the DC mode.

In a possible example, the at least one DC frequency band combination is a frequency band combination that supports a dual transmission mode, and the duplex mode combination is LTE Time Division Duplex (TDD)+NR TDD; in terms of adjusting via the communication unit 503 the uplink transmission configuration of the HPUE according to the transmit power radiation limitation policy, the processing unit 502 is configured to: obtain via the communication unit 503 a NR configuration of a LTE TDD frequency band in each DC frequency band combination; query a preset uplink duty cycle configuration table to determine a maximum uplink duty cycle of a NR TDD frequency band corresponding to the LTE TDD frequency band, wherein the uplink duty cycle configuration table includes correspondence relationships between maximum uplink duty cycles of LTE TDD frequency bands and maximum uplink duty cycles of NR TDD frequency bands constrained by the maximum transmit power combination; and send to a network device the maximum uplink duty cycle of the NR TDD frequency band corresponding to the LTE TDD frequency band to adjust the uplink transmission configuration of the HPUE.

In a possible example, the at least one DC frequency band combination is a frequency band combination that supports a dual transmission mode, and the duplex mode combination is LTE Frequency Division Duplex (FDD)+NR TDD; in terms of adjusting via the communication unit 503 the uplink transmission configuration of the HPUE according to the transmit power radiation limitation policy, the processing unit 502 is configured to: determine via the communication unit 503 through interacting with a network device, that a LTE FDD frequency band supports uplink and downlink configurations of a LTE TDD frequency band; determine a maximum uplink duty cycle of the LTE FDD frequency band and a maximum uplink duty cycle of the NR TDD frequency band in each DC frequency band combination; and send to the network device the maximum uplink duty cycle of the LTE FDD frequency band and the maximum uplink duty cycle of the NR TDD frequency band via the communication unit 503 to adjust the uplink transmission configuration of the HPUE.

Or the processing unit 502 is configured to determine via the communication unit 503 through interacting with the network device, that the LTE FDD frequency band does not support the uplink and downlink configurations of the LTE TDD frequency band; determine the maximum uplink duty cycle of the NR TDD frequency band in each DC frequency band combination; and send to the network device the maximum uplink duty cycle of the NR TDD frequency band via the communication unit 503 to adjust the uplink transmission configuration of the HPUE.

In a possible example, the at least one DC frequency band combination is a frequency band combination that supports a single transmission mode, and the duplex mode combination is LTE FDD+NR TDD; in terms of adjusting via the communication unit 503 the uplink transmission configuration of the HPUE according to the transmit power radiation limitation policy, the processing unit 502 is configured to: determine that the HPUE is in a dual transmission mode or switches from a single transmission mode to the dual transmission mode; determine via the communication unit 503 through interacting with a network device, that a LTE FDD frequency band supports uplink and downlink configurations of a LTE TDD frequency band; determining a maximum uplink duty cycle of the LTE FDD frequency band and a maximum uplink duty cycle of the NR TDD frequency band in each DC frequency band combination; send to the network device the maximum uplink duty cycle of the LTE FDD frequency band and the maximum uplink duty cycle of the NR TDD frequency band via the communication unit 503 to adjust the uplink transmission configuration of the HPUE; or, determine via the communication unit 503 through interacting with the network device, that the LTE FDD frequency band does not support the uplink and downlink configurations of the LTE TDD frequency band; determine the maximum uplink duty cycle of the NR TDD frequency band in each DC frequency band combination; send to the network device the maximum uplink duty cycle of the NR TDD frequency band via the communication unit 503 to adjust the uplink transmission configuration of the HPUE.

Or the processing unit 502 is configured to determine that the HPUE switches from the dual transmission mode to the single transmission mode; if the maximum transmit power combination is 23 dBm+23 dBm, send to the network device a preset maximum uplink duty cycle of each DC frequency band combination via the communication unit 503 to adjust the uplink transmission configuration of the HPUE.

Or if the maximum transmit power combination is 23 dBm+26 dBm, and it is confirmed by interacting with the network device that the time division multiplexing mode is configured as a TDD pattern but the HPUE works in the dual transmission mode, the processing unit 502 is configured to send to the network device maximum uplink duty cycles that are supportable by the LTE FDD frequency band and the NR FDD frequency band in each DC frequency band combination, respectively, via the communication unit 503 to adjust the uplink transmission configuration of the HPUE.

Or if the maximum transmit power combination is 23 dBm+23 dBm or 23 dBm+26 dBm, and the network device configures the TDD pattern but the HPUE works in the single transmission mode, the processing unit 502 is configured to send to the network device the maximum uplink duty cycle of the NR TDD frequency band in each DC frequency band combination, to adjust the uplink transmission configuration of the HPUE, wherein the maximum uplink duty cycle is configured following the NR TDD frequency band.

Or if it is confirmed by interacting with the network device that no TDD pattern is configured, send to the network device the maximum uplink duty cycles that are supportable by the LTE FDD frequency band and the NR FDD frequency band in each DC frequency band combination support, respectively, via the communication unit 503 to adjust the uplink transmission configuration of the HPUE.

In a possible example, the at least one DC frequency band combination is a frequency band combination that supports a single transmission mode, and the duplex mode combination is LTE TDD+NR TDD.

In terms of adjusting via the communication unit the uplink transmission configuration of the HPUE according to the transmit power radiation limitation policy, the processing unit 502 is configured to: if the maximum transmit power combination is 23 dBm+23 dBm, adjust the uplink transmission configuration of the HPUE by the HPUE itself; if the maximum transmit power combination is 23 dBm+26 dBm, and it is confirmed by interacting with a network device that a TDD pattern is configured, and the HPUE works in a dual transmission state, send to the network device a preset maximum uplink duty cycle of each DC frequency band combination via the communication unit 503 to adjust the uplink transmission configuration of the HPUE; if the maximum transmit power combination is 23 dBm+26 dBm, and it is confirmed by interacting with the network device that the TDD pattern is configured, and the HPUE works in the single transmission state or switches from the dual transmission state to the single transmission state or switches from the single transmission state to the dual transmission state, send to the network device the preset maximum uplink duty cycle of each DC frequency band combination via the communication unit 503 to adjust the uplink transmission configuration of the HPUE; if the maximum transmit power combination is 26 dBm+26 dBm, send to the network device the preset maximum uplink duty cycle of each DC frequency band combination via the communication unit 503 to adjust the uplink transmission of the HPUE.

In a possible example, in terms of determining the transmit power radiation limitation policy of the HPUE in the DC mode, the processing unit 502 is configured to: obtain via the communication unit 503 a transmission mode supported by each DC frequency band combination in the at least one DC frequency band combination supported by the HPUE, and obtain the duplex mode combination, the maximum transmit power combination and a regional feature of the HPUE; and according to the transmission mode supported by each DC frequency band combination, the duplex mode combination, the maximum transmit power combination and the regional feature, determine the transmit power radiation limitation policy of the HPUE in the DC mode.

In a possible example, in terms of adjusting the uplink transmission configuration of the HPUE according to the transmit power radiation limitation policy, the processing unit 502 is configured to: obtain via the communication unit 503 a preset DC frequency band combination configuration set corresponding to the regional feature; according to the transmission mode supported by each DC frequency band combination, the duplex mode combination, the maximum transmit power combination and the DC frequency band combination configuration set, determine the TDM pattern for a target DC frequency band combination available for the HPUE; and send to the network device the TDM pattern for the target DC frequency band combination to adjust the uplink transmission configuration of the HPUE.

In a possible example, in terms of determining the transmit power radiation limitation policy of the HPUE in the DC mode, the processing unit 502 is configured to: determine an autonomous power fallback policy of the HPUE as the transmit power radiation limitation policy in the DC mode.

In a possible example, in terms of determining the transmit power radiation limitation policy of the HPUE in the DC mode, the processing unit 502 is configured to: determine a power adjustment policy of the HPUE which is based on sensor triggering as the transmit power radiation limitation policy in the DC mode.

When the processing unit 502 is a processor, the communication unit 503 is a communication interface, and the storage unit 501 is a memory, the HPUE involved in embodiments of the present disclosure may be the HPUE shown in FIG. 3.

Figure 6:
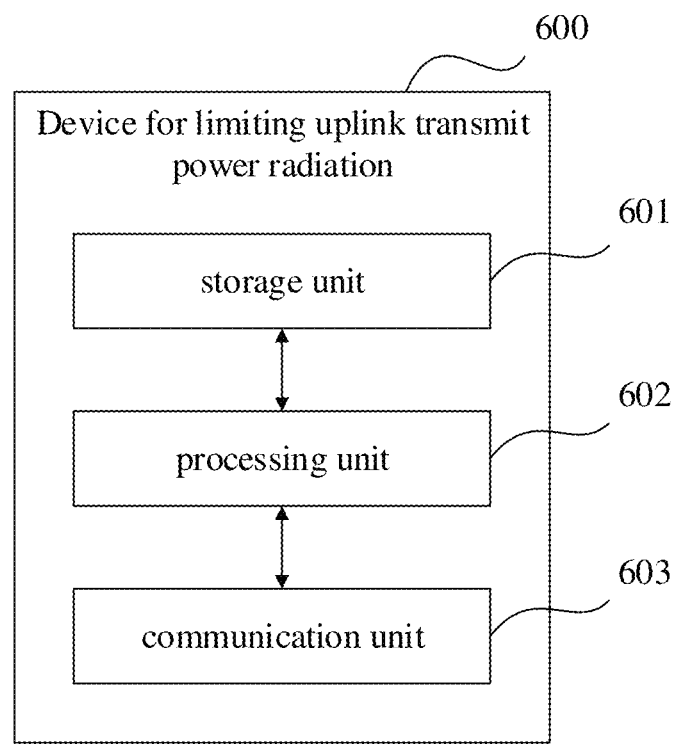
FIG. 6 is a block diagram showing functional units of a device for limiting uplink transmit power radiation according to an embodiment of the present disclosure.

In the case of using an integrated unit, FIG. 6 shows a block diagram of a possible functional unit composition of the device for limiting uplink transmission power radiation involved in the foregoing embodiments. The device 600 for limiting uplink transmit power radiation is applied to a network device. A High Power User Equipment (HPUE) supporting a Dual Connectivity (DC) mode is included within a signal coverage range of the network device. The DC mode refers to dual connectivity based on a DC frequency band combination, the DC frequency band combination includes a Long Term Evolution (LTE) frequency band and a New Radio (NR) frequency band. The device 600 includes a processing unit 602 and a communication unit 603. The processing unit 602 is used to control and manage the actions of the network device. The communication unit 603 is used to support communications between the HPUE and other devices. The HPUE may further include a storage unit 601 for storing program codes and data of the HPUE.

The processing unit 602 may be a processor or a controller, for example, a Central Processing Unit (CPU), a general-purpose processor, a Digital Signal Processor (DSP), an Application-Specific Integrated Circuit (ASIC), a Field Programmable Gate Array (FPGA) or other programmable logic device, a transistor logic device, a hardware component or any combination thereof. The processing unit 602 can implement or execute various exemplary logical blocks, modules, and circuits described in embodiments of the present disclosure. The processor may also be a combination for realizing computing functions, for example, including a combination of one or more microprocessors, a combination of a DSP and a microprocessor, and so on. The communication unit 603 may be a communication interface, a transceiver, a transceiver circuit, and so on. The storage unit 601 may be a memory.

The processing unit 602 is configured to perform the following operations: receiving from the HPUE a maximum uplink duty cycle of a NR Time Division Duplex (TDD) frequency band corresponding to a LTE TDD frequency band via the communication unit 603 to adjust an uplink transmission configuration of the HPUE, wherein the maximum uplink duty cycle of the NR TDD frequency band corresponding to the LTE TDD frequency is obtained by the HPUE by performing the following operations: obtaining a transmission mode supported by each DC frequency band combination in at least one DC frequency band combination supported by the HPUE, and obtaining a duplex mode combination and a maximum transmit power combination of the HPUE; and according to the transmission mode supported by each DC frequency band combination, the duplex mode combination and the maximum transmit power combination, determining a transmit power radiation limitation policy of the HPUE in the DC mode; and obtaining a configuration of the LTE TDD frequency band in each DC frequency band combination; and querying a preset uplink duty cycle configuration table to determine the maximum uplink duty cycle of the NR TDD frequency band corresponding to the LTE TDD frequency band, wherein the uplink duty cycle configuration table includes correspondence relationships between maximum uplink duty cycles of LTE TDD frequency bands and maximum uplink duty cycles of NR TDD frequency bands constrained by the maximum transmit power combination, wherein the at least one DC frequency band combination is a frequency band combination that supports a dual transmission mode, and the duplex mode combination is LTE TDD+NR TDD.

Or the processing unit 602 is configured to perform the following operations: receiving from the HPUE a maximum uplink duty cycle of the LTE FDD frequency band and a maximum uplink duty cycle of the NR TDD frequency band in each DC frequency band combination via the communication unit 603 to adjust the uplink transmission configuration of the HPUE, wherein the maximum uplink duty cycle of the LTE FDD frequency band and the maximum uplink duty cycle of the NR TDD frequency band are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the LTE FDD frequency band supports uplink and downlink configurations of a LTE TDD frequency band, wherein the at least one DC frequency band combination is a frequency band combination that supports the dual transmission mode, and the duplex mode combination is LTE TDD+NR TDD.

Or the processing unit 602 is configured to perform the following operations: receiving from the HPUE the maximum uplink duty cycle of the NR TDD frequency band via the communication unit 603 to adjust the uplink transmission configuration of the HPUE, wherein the maximum uplink duty cycle of the NR TDD frequency band is determined by the HPUE after performing the following operations: obtaining the transmission mode supported by each DC frequency band combination in the at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the LTE FDD frequency band does not support the uplink and downlink configurations of the LTE TDD frequency band, wherein the at least one DC frequency band combination is a frequency band combination that supports the dual transmission mode, and the duplex mode combination is LTE TDD+NR TDD.

Or the processing unit 602 is configured to perform the following operations: receiving from the HPUE the maximum uplink duty cycle of the LTE FDD frequency band and the maximum uplink duty cycle of the NR TDD frequency band in each DC frequency band combination via the communication unit 603 to adjust the uplink transmission of the HPUE, wherein the maximum uplink duty cycle of the LTE FDD frequency band and the maximum uplink duty cycle of the NR TDD frequency band are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE is in the dual transmission mode or switches from the single transmission mode to the dual transmission mode; determining, by interacting with the network device, that the LTE FDD frequency band supports the uplink and downlink configurations of the LTE TDD frequency band, wherein the at least one DC frequency band combination is a frequency band combination that supports the single transmission mode, and the duplex mode combination is LTE FDD+NR TDD.

Or the processing unit 602 is configured to perform the following operations: receiving from the HPUE the maximum uplink duty cycle of the NR TDD frequency band in each DC frequency band combination via the communication unit 603 to adjust the uplink transmission configuration of the HPUE, wherein the maximum uplink duty cycle of the NR TDD frequency band is determined by the HPUE after performing the following operations: obtaining the transmission mode supported by each DC frequency band combination in the at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE is in the dual transmission mode or switches from the single transmission mode to the dual transmission mode; and determining, by interacting with the network device, that the LTE FDD frequency band does not support the uplink and downlink configurations of the LTE TDD frequency band; wherein the at least one DC frequency band combination is a frequency band combination that supports the single transmission mode, and the duplex mode combination is LTE FDD+NR TDD.

Or the processing unit 602 is configured to perform the following operations: receiving from the HPUE a preset maximum uplink duty cycle of each DC frequency band combination via the communication unit 603 to adjust the uplink transmission configuration of the HPUE, wherein the preset maximum uplink duty cycle of each DC frequency band combination is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the HPUE switches from the dual transmission mode to the single transmission mode; and determining that the maximum transmit power combination of the HPUE is 23 dBm+23 dBm, wherein the at least one DC frequency band combination is a frequency band combination that supports the single transmission mode, and the duplex mode combination is LTE FDD+NR TDD.

Or the processing unit 602 is configured to perform the following operations: receiving from the HPUE maximum uplink duty cycles that are supportable by the LTE FDD frequency band and the NR FDD frequency band in each DC frequency band combination, respectively, via the communication unit 603 to adjust the uplink transmission configuration of the HPUE, wherein the maximum uplink duty cycles that are supportable by the LTE FDD frequency band and the NR FDD frequency band are sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and confirming that the maximum transmit power combination is 23 dBm+26 dBm, and confirming by interacting with the network device that the TDD pattern is configured as the time division multiplexing pattern but the HPUE works in the dual transmission mode.

Or the processing unit 602 is configured to perform the following operations: receiving from the HPUE the maximum uplink duty cycle of the NR TDD frequency band in each DC frequency band combination via the communication unit 603 to adjust the uplink transmission configuration of the HPUE, wherein the maximum uplink duty cycle of the NR TDD frequency band is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination of the HPUE is 23 dBm+23 dBm or 23 dBm+26 dBm and the network device configures the TDD pattern but the HPUE works in the single transmission mode, wherein the at least one DC frequency band combination is a frequency band that supports the single transmission mode, and the duplex mode combination is LTE FDD+NR TDD.

Or the processing unit 602 is configured to perform the following operations: receiving from the HPUE the maximum uplink duty cycles that are supportable by the LTE FDD frequency band and the NR FDD frequency band in each DC frequency band combination support, respectively, via the communication unit 603 to adjust the uplink transmission configuration of the HPUE, wherein the maximum uplink duty cycles that are supportable by the LTE FDD frequency band and the NR FDD frequency band in each DC frequency band combination, respectively, are determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; confirming, by interacting with the network device, that no TDD pattern is configured, wherein the at least one DC frequency band combination is a frequency band combination that supports the single transmission mode, and the duplex mode combination is LTE FDD+NR TDD.

Or the processing unit 602 is configured to perform the following operations: receiving from the HPUE the preset maximum uplink duty cycle of each DC frequency band combination via the communication unit 603 to adjust the uplink transmission configuration of the HPUE, wherein the preset maximum uplink duty cycle of each DC frequency band combination is determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; determining that the maximum transmit power combination is 23 dBm+23 dBm, and confirming, by interacting with the network device, that the TDD pattern is configured and the HPUE words in the dual transmission state, wherein the least one DC frequency band combination is a frequency band combination that supports the single transmission mode, and the duplex mode combination is LTE TDD+NR TDD.

Or the processing unit 602 is configured to perform the following operations: receiving from the HPUE the preset maximum uplink duty cycle of each DC frequency band combination via the communication unit 603 to adjust the uplink transmission configuration of the HPUE, wherein the preset maximum uplink duty cycle of each DC frequency band combination is determined by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination is 23 dBm+26 dBm, and confirming, by interacting with the network device, that the TDD pattern is configured and the HPUE works in the single transmission state or switches from the dual transmission state to the single transmission state or switches from the single transmission state to the dual transmission state, wherein the at least one DC frequency is a frequency band combination that supports the single transmission mode, and the duplex mode combination is LTE TDD+NR TDD.

Or the processing unit 602 is configured to perform the following operations: receiving from the HPUE the preset maximum uplink duty cycle of each DC frequency band combination via the communication unit 603 to adjust the uplink transmission configuration of the HPUE, wherein the preset maximum uplink duty cycle of each DC frequency band combination is sent by the HPUE after performing the following operations: obtaining the transmission mode supported by each DC frequency band combination in at least one DC frequency band combination supported by the HPUE, and obtaining the duplex mode combination and the maximum transmit power combination of the HPUE; and according to the transmission mode supported by each DC frequency band combination, the duplex mode combination and the maximum transmit power combination, determining the transmit power radiation limitation policy of the HPUE in the DC mode; and determining that the maximum transmit power combination is 26 dBm+26 dBm, wherein the at least one DC frequency is a frequency band combination that supports the single transmission mode, and the duplex mode combination is LTE TDD+NR TDD.

Or the processing unit 602 is configured to perform the following operations: receiving from the HPUE the Time Division Multiplexing (TDM) pattern for a target DC frequency band combination for the HPUE via the communication unit 603 to adjust the uplink transmission configuration of the HPUE, wherein the TDM pattern for the target DC frequency band combination is sent by the HPUE after performing the following operations: obtaining the transmission mode supported by each DC frequency band combination in the at least one DC frequency band combination supported by the HPUE, and obtaining the duplex mode combination, the maximum transmit power combination and a regional feature of the HPUE; and according to the transmission mode supported by each DC frequency band combination, the duplex mode combination, the maximum transmit power combination and the regional feature, determining the transmit power radiation limitation policy of the HPUE in the DC mode; and obtaining a preset DC frequency band combination configuration set corresponding to the regional features; and according to the transmission mode supported by each DC frequency band combination, the duplex mode combination, the maximum transmit power combination, and the DC frequency band combination configuration set, determining the TDM pattern for the target DC frequency band combination available for the HPUE.

An embodiment of the present disclosure provides a computer-readable storage medium, wherein the computer-readable storage medium stores a computer program for electronic data exchange, and the computer program causes a computer to perform all or part of steps performed by the HPUE in the previously described method embodiments.

An embodiment of the present disclosure provides a computer-readable storage medium, wherein the computer-readable storage medium stores a computer program for electronic data exchange, and the computer program causes a computer to perform all or part of steps performed by the network side device in the previously described method embodiments.

An embodiment of the present disclosure provides a computer program product, wherein the computer program product includes a non-transitory computer-readable storage medium storing a computer program, and the computer program is operable to cause a computer to perform all or part of the steps performed by the terminal in the previously described method. The computer program product may be a software installation package.

The steps of the methods or algorithms described in the embodiments of the present disclosure may be implemented in a hardware manner, or may be implemented in a manner in which a processor executes software instructions. Software instructions can be composed of corresponding software modules, which can be stored in Random Access Memory (RAM), flash memory, Read Only Memory (ROM), Erasable Programmable ROM (EPROM), Electrically EPROM (EEPROM), registers, hard disks, portable hard disks, CD-ROM, or any other form of storage medium known in the art. An exemplary storage medium is coupled to the processor, so that the processor can read information from the storage medium and write information to the storage medium. Of course, the storage medium may also be a constituting part of the processor. The processor and the storage medium may be located in an ASIC. In addition, the ASIC may be located in an access network device, a target network device, or a core network device. According to some other embodiments, the processor and the storage medium may exist as discrete components in the access network device, the target network device, or the core network device.

Those skilled in the art should be aware that, in one or more of the foregoing examples, the functions described in the embodiments of the present disclosure may be implemented in whole or in part by software, hardware, firmware, or any combination thereof. When implemented by software, the functions can be implemented in the form of a computer program product in whole or in part. The computer program product includes one or more computer instructions. When the computer program instructions are loaded and executed on a computer, processes or functions described in the embodiments of the present disclosure are generated in whole or in part. The computer may be a general-purpose computer, a special-purpose computer, a computer network, or other programmable devices. The computer instructions may be stored in a computer-readable storage medium, or transmitted from one computer-readable storage medium to another computer-readable storage medium. For example, the computer instructions may be transmitted from a website, a computer, a server, or a data center to another website, another computer, another server or another data center in a wired manner (such as coaxial cable, optical fiber, Digital Subscriber Line (DSL)) or in a wireless manner (such as infrared, wireless, microwave, etc.). The computer-readable storage medium may be any available medium that can be accessed by a computer or a data storage device such as a server or data center integrated with one or more available medium. The available medium may be a magnetic medium (for example, a floppy disk, a hard disk, a magnetic tape), an optical medium (for example, a Digital Video Disc (DVD)), or a semiconductor medium (for example, a Solid State Disk (SSD)), and so on.

The specific implementations described above further describe the purpose, technical solutions and beneficial effects of the embodiments of the present disclosure in further detail. It should be understood that the foregoing descriptions show only exemplary implementations of the present disclosure, and are not intended to limit the protection scope of the embodiments of the present disclosure, any modification, equivalent replacement, improvement, etc. made on the basis of the technical solutions of the embodiments of the present disclosure shall fall within the protection scope of the embodiments of the present disclosure.

What is claimed is:

1. A method for limiting uplink transmit power radiation, the method being applied to a High Power User Equipment (HPUE) supporting a Dual Connectivity (DC) mode, wherein the DC mode refers to dual connectivity based on a DC frequency band combination, the DC frequency band combination comprises a Long Term Evolution (LTE) frequency band and a New Radio (NR) frequency band, and the method comprises:

determining a transmit power radiation limitation policy of the HPUE in the DC mode; and adjusting an uplink transmission configuration of the HPUE according to the transmit power radiation limitation policy, wherein the uplink transmission configuration comprises a maximum uplink duty cycle of at least one of the LTE frequency band or the NR frequency band in the DC frequency band combination;

wherein determining the transmit power radiation limitation policy of the HPUE in the DC mode comprises:

obtaining a transmission mode supported by each DC frequency band combination in at least one DC frequency band combination supported by the HPUE, and obtaining a duplex mode combination and a maximum transmit power combination of the HPUE; and according to the transmission mode supported by each DC frequency band combination, the duplex mode combination and the maximum transmit power combination, determining the transmit power radiation limitation policy of the HPUE in the DC mode;

wherein in response to that the at least one DC frequency band combination is a frequency band combination that supports a dual transmission mode, and the duplex mode combination is LTE Frequency Division Duplex (FDD)+NR TDD, adjusting the uplink transmission configuration of the HPUE according to the transmit power radiation limitation policy comprises:

determining, by interacting with a network device, that a LTE FDD frequency band supports uplink and downlink configurations of a LTE TDD frequency band; determining a maximum uplink duty cycle of the LTE FDD frequency band and a maximum uplink duty cycle of the NR TDD frequency band in each DC frequency band combination; and sending to the network device the maximum uplink duty cycle of the LTE FDD frequency band and the maximum uplink duty cycle of the NR TDD frequency band to adjust the uplink transmission configuration of the HPUE; or determining, by interacting with the network device, that the LTE FDD frequency band does not support the uplink and downlink configurations of the LTE TDD frequency band; determining the maximum uplink duty cycle of the NR TDD frequency band in each DC frequency band combination; and sending to the network device the maximum uplink duty cycle of the NR TDD frequency band to adjust the uplink transmission configuration of the HPUE.

2. The method according to claim 1, wherein in response to the at least one DC frequency band combination being a frequency band combination that supports the dual transmission mode, and the duplex mode combination is LTE Time Division Duplex (TDD)+NR TDD, adjusting the uplink transmission configuration of the HPUE according to the transmit power radiation limitation policy comprises:

obtaining a configuration of a LTE TDD frequency band in each DC frequency band combination;

querying a preset uplink duty cycle configuration table to determine a maximum uplink duty cycle of a NR TDD frequency band corresponding to the LTE TDD frequency band, wherein the uplink duty cycle configuration table comprises correspondence relationships between maximum uplink duty cycles of LTE TDD frequency bands and maximum uplink duty cycles of NR TDD frequency bands constrained by the maximum transmit power combination; and sending to a network device the maximum uplink duty cycle of the NR TDD frequency band corresponding to the LTE TDD frequency band to adjust the uplink transmission configuration of the HPUE.

3. The method according to claim 1, wherein in response to the at least one DC frequency band combination being a frequency band combination that supports a single transmission mode, and the duplex mode combination is LTE FDD+NR TDD, and adjusting the uplink transmission configuration of the HPUE according to the transmit power radiation limitation policy comprises:

determining that the HPUE is in a dual transmission mode or switches from a single transmission mode to the dual transmission mode; and determining, by interacting with a network device, that a LTE FDD frequency band supports uplink and downlink configurations of a LTE TDD frequency band; determining a maximum uplink duty cycle of the LTE FDD frequency band and a maximum uplink duty cycle of the NR TDD frequency band in each DC frequency band combination; sending to the network device the maximum uplink duty cycle of the LTE FDD frequency band and the maximum uplink duty cycle of the NR TDD frequency band to adjust the uplink transmission configuration of the HPUE; or, determining, by interacting with the network device, that the LTE FDD frequency band does not support the uplink and downlink configurations of the LTE TDD frequency band; determining the maximum uplink duty cycle of the NR TDD frequency band in each DC frequency band combination; sending to the network device the maximum uplink duty cycle of the NR TDD frequency band to adjust the uplink transmission configuration of the HPUE;

determining that the HPUE switches from the dual transmission mode to the single transmission mode;

in response to the maximum transmit power combination being 23 dBm+23 dBm, sending to the network device a preset maximum uplink duty cycle of each DC frequency band combination to adjust the uplink transmission configuration of the HPUE;

in response to that the maximum transmit power combination is 23 dBm+26 dBm, and it is confirmed by interacting with the network device that the time division multiplexing mode is configured as a TDD pattern but the HPUE works in the dual transmission mode, sending to the network device maximum uplink duty cycles that are supportable by the LTE FDD frequency band and the NR FDD frequency band in each DC frequency band combination, respectively, to adjust the uplink transmission configuration of the HPUE;

in response to that the maximum transmit power combination is 23 dBm+23 dBm or 23 dBm+26 dBm, and the network device configures the TDD pattern but the HPUE works in the single transmission mode, sending to the network device the maximum uplink duty cycle of the NR TDD frequency band in each DC frequency band combination, to adjust the uplink transmission configuration of the HPUE, wherein the maximum uplink duty cycle is configured following the NR TDD frequency band; or in response to that it is confirmed by interacting with the network device that no TDD pattern is configured, sending to the network device the maximum uplink duty cycles that are supportable by the LTE FDD frequency band and the NR FDD frequency band in each DC frequency band combination support, respectively, to adjust the uplink transmission configuration of the HPUE.

4. The method according to claim 1, wherein in response to the at least one DC frequency band combination being a frequency band combination that supports a single transmission mode, and the duplex mode combination is LTE TDD+NR TDD, adjusting the uplink transmission configuration of the HPUE according to the transmit power radiation limitation policy comprises:

in response to the maximum transmit power combination being 23 dBm+23 dBm, adjusting the uplink transmission configuration of the HPUE by the HPUE itself;

in response to that the maximum transmit power combination is 23 dBm+26 dBm, and it is confirmed by interacting with a network device that a TDD pattern is configured, and the HPUE works in a dual transmission state, sending to the network device a preset maximum uplink duty cycle of each DC frequency band combination to adjust the uplink transmission configuration of the HPUE;

in response to that the maximum transmit power combination is 23 dBm+26 dBm, and it is confirmed by interacting with the network device that the TDD pattern is configured, and the HPUE works in the single transmission state or switches from the dual transmission state to the single transmission state or switches from the single transmission state to the dual transmission state, sending to the network device the preset maximum uplink duty cycle of each DC frequency band combination to adjust the uplink transmission configuration of the HPUE; or in response to the maximum transmit power combination being 26 dBm+26 dBm, sending to the network device the preset maximum uplink duty cycle of each DC frequency band combination to adjust the uplink transmission of the HPUE.

5. A High Power User Equipment (HPUE), wherein the HPUE supports a Dual Connectivity (DC) mode, wherein the DC mode refers to dual connectivity based on a DC frequency band combination, the DC frequency band combination comprises a Long Term Evolution (LTE) frequency band and a New Radio (NR) frequency band, wherein the HPUE comprising a processor, a memory, a communication interface and one or more programs, the one or more programs are stored in the memory and configured to be executed by the processor, and when the one or more programs are executed by the processor, the HPUE is caused to:

determine a transmit power radiation limitation policy of the HPUE in the DC mode; and adjust an uplink transmission configuration of the HPUE according to the transmit power radiation limitation policy, wherein the uplink transmission configuration comprises a maximum uplink duty cycle of at least one of the LTE frequency band or the NR frequency band in the DC frequency band combination;

wherein determining the transmit power radiation limitation policy of the HPUE in the DC mode comprises:

obtaining a transmission mode supported by each DC frequency band combination in at least one DC frequency band combination supported by the HPUE, and obtaining a duplex mode combination and a maximum transmit power combination of the HPUE; and according to the transmission mode supported by each DC frequency band combination, the duplex mode combination and the maximum transmit power combination, determining the transmit power radiation limitation policy of the HPUE in the DC mode;

wherein in response to that the at least one DC frequency band combination is a frequency band combination that supports a dual transmission mode, and the duplex mode combination is LTE Frequency Division Duplex (FDD)+NR TDD, adjusting the uplink transmission configuration of the HPUE according to the transmit power radiation limitation policy comprises:

determining, by interacting with a network device, that a LTE FDD frequency band supports uplink and downlink configurations of a LTE TDD frequency band; determining a maximum uplink duty cycle of the LTE FDD frequency band and a maximum uplink duty cycle of the NR TDD frequency band in each DC frequency band combination; and sending to the network device the maximum uplink duty cycle of the LTE FDD frequency band and the maximum uplink duty cycle of the NR TDD frequency band to adjust the uplink transmission configuration of the HPUE; or determining, by interacting with the network device, that the LTE FDD frequency band does not support the uplink and downlink configurations of the LTE TDD frequency band; determining the maximum uplink duty cycle of the NR TDD frequency band in each DC frequency band combination; and sending to the network device the maximum uplink duty cycle of the NR TDD frequency band to adjust the uplink transmission configuration of the HPUE.

6. The HPUE according to claim 5, wherein when the one or more programs are executed by the processor, the HPUE is caused to:

in response to the at least one DC frequency band combination being a frequency band combination that supports the dual transmission mode, and the duplex mode combination is LTE Time Division Duplex (TDD)+NR TDD, obtain a configuration of a LTE TDD frequency band in each DC frequency band combination;

query a preset uplink duty cycle configuration table to determine a maximum uplink duty cycle of a NR TDD frequency band corresponding to the LTE TDD frequency band, wherein the uplink duty cycle configuration table comprises correspondence relationships between maximum uplink duty cycles of LTE TDD frequency bands and maximum uplink duty cycles of NR TDD frequency bands constrained by the maximum transmit power combination; and send to a network device the maximum uplink duty cycle of the NR TDD frequency band corresponding to the LTE TDD frequency band to adjust the uplink transmission configuration of the HPUE.

7. The HPUE according to claim 5, wherein when the one or more programs are executed by the processor, the HPUE is caused to:

in response to the at least one DC frequency band combination being a frequency band combination that supports a single transmission mode, and the duplex mode combination is LTE FDD+NR TDD, determine that the HPUE is in a dual transmission mode or switches from a single transmission mode to the dual transmission mode; and determine, by interacting with a network device, that a LTE FDD frequency band supports uplink and downlink configurations of a LTE TDD frequency band; determine a maximum uplink duty cycle of the LTE FDD frequency band and a maximum uplink duty cycle of the NR TDD frequency band in each DC frequency band combination; send to the network device the maximum uplink duty cycle of the LTE FDD frequency band and the maximum uplink duty cycle of the NR TDD frequency band to adjust the uplink transmission configuration of the HPUE; or, determine, by interacting with the network device, that the LTE FDD frequency band does not support the uplink and downlink configurations of the LTE TDD frequency band; determine the maximum uplink duty cycle of the NR TDD frequency band in each DC frequency band combination; send to the network device the maximum uplink duty cycle of the NR TDD frequency band to adjust the uplink transmission configuration of the HPUE;

determine that the HPUE switches from the dual transmission mode to the single transmission mode; in response to the maximum transmit power combination being 23 dBm+23 dBm, sending to the network device a preset maximum uplink duty cycle of each DC frequency band combination to adjust the uplink transmission configuration of the HPUE;

in response to that the maximum transmit power combination is 23 dBm+26 dBm, and it is confirmed by interacting with the network device that the time division multiplexing mode is configured as a TDD pattern but the HPUE works in the dual transmission mode, send to the network device maximum uplink duty cycles that are supportable by the LTE FDD frequency band and the NR FDD frequency band in each DC frequency band combination, respectively, to adjust the uplink transmission configuration of the HPUE;

in response to that the maximum transmit power combination is 23 dBm+23 dBm or 23 dBm+26 dBm, and the network device configures the TDD pattern but the HPUE works in the single transmission mode, send to the network device the maximum uplink duty cycle of the NR TDD frequency band in each DC frequency band combination, to adjust the uplink transmission configuration of the HPUE, wherein the maximum uplink duty cycle is configured following the NR TDD frequency band; or in response to that it is confirmed by interacting with the network device that no TDD pattern is configured, send to the network device the maximum uplink duty cycles that are supportable by the LTE FDD frequency band and the NR FDD frequency band in each DC frequency band combination support, respectively, to adjust the uplink transmission configuration of the HPUE.

8. The HPUE according to claim 5, wherein when the one or more programs are executed by the processor, the HPUE is caused to:

in response to the at least one DC frequency band combination being a frequency band combination that supports a single transmission mode, and the duplex mode combination is LTE TDD+NR TDD:

in response to the maximum transmit power combination being 23 dBm+23 dBm, adjust the uplink transmission configuration of the HPUE by the HPUE itself;

in response that the maximum transmit power combination is 23 dBm+26 dBm, and it is confirmed by interacting with a network device that a TDD pattern is configured, and the HPUE works in a dual transmission state, send to the network device a preset maximum uplink duty cycle of each DC frequency band combination to adjust the uplink transmission configuration of the HPUE;

in response to that the maximum transmit power combination is 23 dBm+26 dBm, and it is confirmed by interacting with the network device that the TDD pattern is configured, and the HPUE works in the single transmission state or switches from the dual transmission state to the single transmission state or switches from the single transmission state to the dual transmission state, send to the network device the preset maximum uplink duty cycle of each DC frequency band combination to adjust the uplink transmission configuration of the HPUE; or in response to the maximum transmit power combination being 26 dBm+26 dBm, send to the network device the preset maximum uplink duty cycle of each DC frequency band combination to adjust the uplink transmission of the HPUE.

* * * * *